(12) United States Patent
Klassen et al.

(10) Patent No.: US 11,740,763 B2
(45) Date of Patent: *Aug. 29, 2023

(54) PREVIEWING A NEW EVENT ON A SMALL SCREEN DEVICE

(71) Applicant: BlackBerry Limited, Waterloo (CA)

(72) Inventors: Gerhard D. Klassen, Waterloo (CA); Craig A. Dunk, Guelph (CA); Christopher R. Wormald, Kitchener (CA)

(73) Assignee: BlackBerry Limited, Waterloo (CA)

( * ) Notice: Subject to any disclaimer, the term of this patent is extended or adjusted under 35 U.S.C. 154(b) by 20 days.

This patent is subject to a terminal disclaimer.

(21) Appl. No.: 15/790,586

(22) Filed: Oct. 23, 2017

(65) Prior Publication Data

US 2018/0046333 A1 Feb. 15, 2018

Related U.S. Application Data

(63) Continuation of application No. 13/481,379, filed on May 25, 2012, now Pat. No. 9,830,045, which is a
(Continued)

(51) Int. Cl.
*G06F 3/0482* (2013.01)
*G06F 3/04817* (2022.01)
(Continued)

(52) U.S. Cl.
CPC .......... *G06F 3/0482* (2013.01); *G06F 3/0488* (2013.01); *G06F 3/04817* (2013.01); *G06Q 10/107* (2013.01); *H04L 51/04* (2013.01)

(58) Field of Classification Search
CPC .. G06F 3/0482; G06F 3/04817; G06F 3/0488; G06F 3/0481; G06Q 10/107; H04L 51/04
See application file for complete search history.

(56) References Cited

U.S. PATENT DOCUMENTS 4,868,560 A 9/1989 Oliwa
5,333,256 A 7/1994 Green et al.
(Continued)

FOREIGN PATENT DOCUMENTS

EP 0943987 A1 9/1999
JP 05-068054 3/1993
(Continued)

OTHER PUBLICATIONS webopedia.com definition of "session" (Year: 2020).*
(Continued)

*Primary Examiner* — Cesar B Paula
*Assistant Examiner* — John M Heffington
(74) *Attorney, Agent, or Firm* — Fish & Richardson P.C.

(57) ABSTRACT

Method and apparatus for previewing new events in a computing device having a plurality of applications for managing respective events are described. Individual applications are each represented by an application icon on a screen of a graphical user interface for the device. In response to a new event of a one of the applications, the application's icon is visually modified to notify of the new event. A visual modification may be determined in response to the new event, for example, to preview a content of the event. The visual modification may include a count of all new events that remain to be disposed. On a selection of the visually modified icon, additional previewing may be provided. Activation of the application having a visually modified application icon may be configured to automatically initiate the application at the new event.

18 Claims, 9 Drawing Sheets

Related U.S. Application Data continuation of application No. 13/358,737, filed on Jan. 26, 2012, now Pat. No. 8,631,353, which is a continuation of application No. 10/784,781, filed on Feb. 24, 2004, now Pat. No. 8,209,634.

(60) Provisional application No. 60/525,958, filed on Dec. 1, 2003.

(51) Int. Cl.
*G06F 3/0488* (2022.01)
*G06Q 10/107* (2023.01)
*H04L 51/04* (2022.01)

(56) References Cited

U.S. PATENT DOCUMENTS

| | | |
|---|---|---|
| 5,479,408 A | 12/1995 | Will |
| 5,617,526 A | 4/1997 | Oran et al. |
| 5,634,102 A | 5/1997 | Capps |
| 5,724,279 A | 3/1998 | Benaloh et al. |
| 5,793,365 A | 8/1998 | Tang et al. |
| 5,872,521 A | 2/1999 | Lopatukin et al. |
| 5,956,486 A | 9/1999 | Hickman et al. |
| 5,960,173 A | 9/1999 | Tang et al. |
| 5,990,887 A | 11/1999 | Redpath et al. |
| 6,131,046 A | 10/2000 | Sano et al. |
| 6,169,911 B1 | 1/2001 | Wagner et al. |
| 6,333,973 B1 | 12/2001 | Smith et al. |
| 6,346,952 B1 | 2/2002 | Shtivelman |
| 6,385,456 B2 | 5/2002 | Lawrence et al. |
| 6,385,459 B1 | 5/2002 | Lawrence et al. |
| 6,385,662 B1 | 5/2002 | Moon et al. |
| 6,393,307 B1 | 5/2002 | Kim |
| 6,396,518 B1 | 5/2002 | Dow et al. |
| 6,424,354 B1 | 7/2002 | Matheny et al. |
| 6,430,405 B1 | 8/2002 | Jambhekar et al. |
| 6,434,599 B1 | 8/2002 | Porter |
| 6,466,236 B1 | 10/2002 | Pivowar et al. |
| 6,466,654 B1 | 10/2002 | Cooper |
| 6,493,547 B1 | 12/2002 | Raith |
| 6,519,629 B2 | 2/2003 | Harvey et al. |
| 6,539,421 B1 | 3/2003 | Appelman et al. |
| 6,628,194 B1 | 9/2003 | Hellebust et al. |
| 6,691,159 B1 | 2/2004 | Grewal et al. |
| 6,697,840 B1 | 2/2004 | Godefroid et al. |
| 6,721,402 B2 | 4/2004 | Usami |
| 6,725,228 B1 | 4/2004 | Clark et al. |
| 6,741,232 B1 | 5/2004 | Siedlikowski |
| 6,757,362 B1 | 6/2004 | Cooper |
| 6,788,949 B1 | 9/2004 | Bansal |
| 6,842,795 B2 | 1/2005 | Keller |
| 6,907,447 B1 * | 6/2005 | Cooperman ......... G06Q 10/107 709/203 |
| 6,965,918 B1 | 11/2005 | Arnold et al. |
| 6,970,906 B1 | 11/2005 | Parsons et al. |
| 6,981,223 B2 | 12/2005 | Becker et al. |
| 6,993,574 B2 | 1/2006 | Hall |
| 7,003,279 B2 | 2/2006 | Nickum |
| 7,127,685 B2 | 10/2006 | Canfield et al. |
| 7,159,192 B2 | 1/2007 | Dobronsky |
| 7,219,302 B1 | 5/2007 | O,Shaughnessy |
| 7,275,215 B2 | 9/2007 | Werndorfer et al. |
| 7,278,108 B2 | 10/2007 | Duarte et al. |
| 7,281,215 B1 * | 10/2007 | Canfield ............... G06Q 10/10 715/752 |
| 7,284,207 B2 | 10/2007 | Canfield et al. |
| 7,370,277 B1 * | 5/2008 | Canfield ............. G06Q 10/107 715/711 |
| 7,379,066 B1 | 5/2008 | Ostermann et al. |
| 7,386,535 B1 | 6/2008 | Kalucha et al. |
| 7,433,920 B2 | 10/2008 | Blagvedt |
| 7,434,177 B1 | 10/2008 | Ording et al. |
| 7,472,351 B1 | 12/2008 | Zilka |
| 7,493,573 B2 | 2/2009 | Wagner |
| 7,596,540 B2 | 9/2009 | Tzuya et al. |
| 7,606,866 B2 | 10/2009 | Mora |
| 7,631,266 B2 | 12/2009 | Werndorfer et al. |
| 7,640,176 B1 | 12/2009 | Aldrich |
| 7,647,096 B2 | 1/2010 | Nowinski |
| 7,743,340 B2 | 6/2010 | Horvitz et al. |
| 7,802,187 B2 | 9/2010 | Yoshida |
| 7,813,488 B2 | 10/2010 | Kozdon et al. |
| 7,882,434 B2 | 2/2011 | Slotznick et al. |
| 7,900,148 B1 | 3/2011 | Canfield et al. |
| 7,921,368 B2 | 4/2011 | Moody et al. |
| 8,209,634 B2 | 6/2012 | Klassen et al. |
| 8,285,982 B2 | 10/2012 | Dobronsky |
| 8,397,205 B2 | 3/2013 | Kornerup et al. |
| 8,429,543 B2 | 4/2013 | Canfield et al. |
| 8,458,278 B2 | 6/2013 | Christie et al. |
| 8,489,146 B2 | 7/2013 | Burns et al. |
| 2002/0026483 A1 | 2/2002 | Isaacs et al. |
| 2002/0035607 A1 | 3/2002 | Checkoway |
| 2002/0035613 A1 | 3/2002 | Hirayama |
| 2002/0072039 A1 | 6/2002 | Rtischev et al. |
| 2002/0073207 A1 | 6/2002 | Widger et al. |
| 2002/0101446 A1 * | 8/2002 | Tang ..................... G06Q 10/10 715/751 |
| 2002/0130904 A1 | 9/2002 | Becker et al. |
| 2002/0138584 A1 | 9/2002 | Fujimoto et al. |
| 2002/0042758 A1 | 10/2002 | Abiko et al. |
| 2002/0142758 A1 | 10/2002 | Abiko et al. |
| 2002/0154746 A1 | 10/2002 | Usami |
| 2002/0160817 A1 | 10/2002 | Salmimaa et al. |
| 2002/0165969 A1 | 11/2002 | Gallant |
| 2002/0173308 A1 | 11/2002 | Dorenbosch |
| 2002/0194379 A1 | 12/2002 | Bennett et al. |
| 2002/0198008 A1 | 12/2002 | Smith |
| 2003/0011646 A1 | 1/2003 | Levine et al. |
| 2003/0013483 A1 | 1/2003 | Ausems et al. |
| 2003/0034878 A1 | 2/2003 | Hull |
| 2003/0045279 A1 | 3/2003 | Shostak |
| 2003/0052915 A1 | 3/2003 | Brown et al. |
| 2003/0065779 A1 | 4/2003 | Malik |
| 2003/0073434 A1 | 4/2003 | Shostak |
| 2003/0104841 A1 | 6/2003 | Yamamoto |
| 2003/0131023 A1 | 7/2003 | Bassett et al. |
| 2003/0143983 A1 | 7/2003 | Crompton |
| 2003/0167310 A1 | 9/2003 | Moody et al. |
| 2003/0210265 A1 | 11/2003 | Haimberg |
| 2003/0219104 A1 | 11/2003 | Malik |
| 2003/0229722 A1 | 12/2003 | Beyda |
| 2004/0010615 A1 | 1/2004 | Ernst |
| 2004/0056893 A1 | 3/2004 | Canfield et al. |
| 2004/0068519 A1 | 4/2004 | Smukler |
| 2004/0090469 A1 | 5/2004 | Moon et al. |
| 2004/0093314 A1 | 5/2004 | Swan |
| 2004/0098754 A1 | 5/2004 | Vella et al. |
| 2004/0155908 A1 * | 8/2004 | Wagner ............... G06F 3/04817 715/854 |
| 2004/0155909 A1 | 8/2004 | Wagner |
| 2004/0172455 A1 | 9/2004 | Green et al. |
| 2004/0172456 A1 | 9/2004 | Green et al. |
| 2004/0204041 A1 | 10/2004 | Fillebrown |
| 2004/0223598 A1 | 11/2004 | Spiridellis |
| 2004/0225901 A1 | 11/2004 | Bear et al. |
| 2004/0229200 A1 | 11/2004 | McKeon et al. |
| 2004/0243679 A1 | 12/2004 | Tyler |
| 2004/0261031 A1 | 12/2004 | Tuomainen |
| 2005/0020316 A1 | 1/2005 | Mahini |
| 2005/0038764 A1 | 2/2005 | Minsky et al. |
| 2005/0047563 A1 | 3/2005 | Fellenstein et al. |
| 2005/0055405 A1 | 3/2005 | Kaminsky et al. |
| 2005/0071736 A1 | 3/2005 | Schneider et al. |
| 2005/0076103 A1 * | 4/2005 | Hilf ....................... G06Q 30/02 709/220 |
| 2005/0080851 A1 | 4/2005 | Kent, Jr. |
| 2005/0080862 A1 | 4/2005 | Kent, Jr. |
| 2005/0080867 A1 | 4/2005 | Malik |
| 2005/0080889 A1 | 4/2005 | Malik |
| 2005/0091314 A1 | 4/2005 | Blagvedt |
| 2005/0091609 A1 | 4/2005 | Matthews et al. |
| 2005/0108332 A1 | 5/2005 | Vaschillo |

(56) References Cited

U.S. PATENT DOCUMENTS

| | | | |
|---|---|---|---|
| 2005/0114777 A1 | 5/2005 | Szeto | |
| 2005/0117733 A1 | 6/2005 | Widger et al. | |
| 2005/0120306 A1 | 6/2005 | Klassen et al. | |
| 2005/0138183 A1 | 6/2005 | O'Rourke et al. | |
| 2005/0165880 A1 | 7/2005 | Moody et al. | |
| 2005/0225901 A1 | 10/2005 | Otsubo et al. | |
| 2005/0248437 A1 | 11/2005 | Hellebust et al. | |
| 2006/0020904 A1 | 1/2006 | Aaltonen et al. | |
| 2006/0030295 A1 | 2/2006 | Adams et al. | |
| 2006/0084450 A1* | 4/2006 | Dam Nielsen | H04M 1/72427 455/466 |
| 2006/0256130 A1 | 11/2006 | Gonzalez | |
| 2006/0007051 A1 | 12/2006 | Bear et al. | |
| 2006/0284787 A1 | 12/2006 | Bear et al. | |
| 2007/0038718 A1 | 2/2007 | Khoo et al. | |
| 2007/0060206 A1 | 3/2007 | Dam Nielsen et al. | |
| 2007/0129068 A1 | 6/2007 | Ishigaki | |
| 2007/0195007 A1 | 8/2007 | Bear et al. | |
| 2007/0213099 A1 | 9/2007 | Bast | |
| 2008/0200215 A1 | 8/2008 | De Bast | |
| 2008/0220751 A1 | 9/2008 | De Bast | |
| 2008/0282162 A1 | 11/2008 | Lincke et al. | |
| 2008/0301250 A1 | 12/2008 | Hardy et al. | |
| 2009/0006958 A1 | 1/2009 | Pojjoia et al. | |
| 2009/0006959 A1 | 1/2009 | Kalenius et al. | |
| 2009/0106063 A1 | 4/2009 | Minsky et al. | |
| 2009/0288004 A1 | 11/2009 | Strandell et al. | |
| 2010/0192064 A1 | 7/2010 | Beppu et al. | |
| 2011/0054970 A1 | 3/2011 | Minsky et al. | |
| 2011/0107253 A1 | 5/2011 | Levine et al. | |
| 2011/0265008 A1 | 10/2011 | Levine et al. | |
| 2013/0067352 A1 | 3/2013 | Canfield et al. | |
| 2013/0067353 A1 | 3/2013 | Canfield et al. | |
| 2013/0095823 A1 | 4/2013 | Klassen | |
| 2013/0346515 A1* | 12/2013 | DeLuca | G06Q 50/01 709/206 |

FOREIGN PATENT DOCUMENTS

| | | |
|---|---|---|
| JP | 2000-330913 | 11/2000 |
| JP | 2002-196867 | 7/2002 |
| JP | 2003-108280 | 4/2003 |
| JP | 2003271277 | 9/2003 |
| WO | WO 98/48550 A1 | 10/1998 |
| WO | WO 2002/21413 | 3/2002 |
| WO | WO03014905 A2 | 2/2003 |
| WO | WO2003014905 A2 | 2/2003 |

OTHER PUBLICATIONS techterms.com definition of "session" (Year: 2020).*
Session Definition by techterms.com May 24, 2011 (Year: 2011).*
Definition of session on techterms.com via Wayback Machine (Year: 2021).*
"Adams® While You Were Out' Message Pad 4.25 x 5.5 (50 Sheets)," Office Depot, https://www.officedepot.com/a/products/187578/Adams-While-You-Were-Out-Message, 2 pages.
Blackberry Limited v. Facebook, Inc., et al., "Exhibit B1: Defendant's Invalidity Contentions," Case 2:18-CV-01844 (C.D. Cal.), U.S. Pat. No. 8,209,634, dated Oct. 29, 2018, 20 pages.
Blackberry Limited v. Facebook, Inc., et al., "Exhibit B10: Defendant's Invalidity Contentions," Case 2:18-CV-01844 (C.D. Cal.), U.S. Pat. No. 8,209,634, dated Oct. 29, 2018, 29 pages.
Blackberry Limited v. Facebook, Inc., et al., "Exhibit B11: Defendant's Invalidity Contentions," Case 2:18-CV-01844 (C.D. Cal.), U.S. Pat. No. 8,209,634, dated Oct. 29, 2018, 36 pages.
Blackberry Limited v. Facebook, Inc., et al., "Exhibit B12: Defendant's Invalidity Contentions," Case 2:18-CV-01844 (C.D. Cal.), U.S. Pat. No. 8,209,634, dated Oct. 29, 2018, 25 pages.
Blackberry Limited v. Facebook, Inc., et al., "Exhibit B13: Defendant's Invalidity Contentions," Case 2:18-CV-01844 (C.D. Cal.), U.S. Pat. No. 8,209,634, dated Oct. 29, 2018, 18 pages.
Blackberry Limited v. Facebook, Inc., et al., "Exhibit B14: Defendant's Invalidity Contentions," Case 2:18-CV-01844 (C.D. Cal.), U.S. Pat. No. 8,209,634, dated Oct. 29, 2018, 12 pages.
Blackberry Limited v. Facebook, Inc., et al., "Exhibit B2: Defendant's Invalidity Contentions," Case 2:18-CV-01844 (C.D. Cal.), U.S. Pat. No. 8,209,634, dated Oct. 29, 2018, 28 pages.
Blackberry Limited v. Facebook, Inc., et al., "Exhibit B3: Defendant's Invalidity Contentions," Case 2:18-CV-01844 (C.D. Cal.), U.S. Pat. No. 8,209,634, dated Oct. 29, 2018, 25 pages.
Blackberry Limited v. Facebook, Inc., et al., "Exhibit B4: Defendant's Invalidity Contentions," Case 2:18-CV-01844 (C.D. Cal.), U.S. Pat. No. 8,209,634, dated Oct. 29, 2018, 22 pages.
Blackberry Limited v. Facebook, Inc., et al., "Exhibit B5: Defendant's Invalidity Contentions," Case 2:18-CV-01844 (C.D. Cal.), U.S. Pat. No. 8,209,634, dated Oct. 29, 2018, 29 pages.
Blackberry Limited v. Facebook, Inc., et al., "Exhibit B6: Defendant's Invalidity Contentions," Case 2:18-CV-01844 (C.D. Cal.), U.S. Pat. No. 8,209,634, dated Oct. 29, 2018, 20 pages.
Blackberry Limited v. Facebook, Inc., et al., "Exhibit B7: Defendant's Invalidity Contentions," Case 2:18-CV-01844 (C.D. Cal.), U.S. Pat. No. 8,209,634, dated Oct. 29, 2018, 23 pages.
Blackberry Limited v. Facebook, Inc., et al., "Exhibit B8: Defendant's Invalidity Contentions," Case 2:18-CV-01844 (C.D. Cal.), U.S. Pat. No. 8,209,634, dated Oct. 29, 2018, 21 pages.
Blackberry Limited v. Facebook, Inc., et al., "Exhibit B9: Defendant's Invalidity Contentions," Case 2:18-CV-01844 (C.D. Cal.), U.S. Pat. No. 8,209,634, dated Oct. 29, 2018, 25 pages.
Blackberry Limited v. Facebook, Inc., et al., Whatsapp Inc., Instagram, Inc. and Instagram,LLC, "Defendants' Invalidity Contentions Re U.S. Pat. Nos. 7,372,961; 8,279,173; 8,429,236; 8,677,250; 9,349,120," Case 2:18-CV-01844-GW-KS, Oct. 29, 2018, 189 pages.
Blackberry Limited v. Facebook, Inc., Whatsapp Inc., Instagram, Inc. and Instagram,LLC; Blackberry Limited v. Snap Inc., "Defendants' Joint Invalidity Contentions Re U.S. Pat. Nos. 8,209,634; 8,307,713; 8,296,351; and 8,676,929," Case 2:18-CV-01844-GW-KS; 2:18-CV-02693-GW-KS, Oct. 29, 2018, 152 pages.
Boyce, "Chapter 11: Using Outlook Express for Public and Private Newsgroups," Microsoft Outlook Version 2002 Inside Out, 2001, 297-327.
Boyce, "Chapter 12: Integrating Outlook Express and Outlook & Chapter 13: Using Outlook Express for Public and Private Newsgroups," Microsoft Office Outlook 2003 Inside Out, 2003, 341-382.
Droste, "Monster: Savvy Telephone Etiquette for Admins," Monster.com, Feb. 1, 2002, https://www.monster.com/career-advice/article/savvy-telephone-etiquette, 2 pages.
Feiler, "Mac OS X: The Complete Reference," Osborne/McGraw-Hill, 2001, 369 pages.
McPherson, "Chapter 2: Getting Acquainted with Your Pocket PC," How to Do Everything with Your Pocket PC, 2nd ed. Feb. 2002, 32-33.
Miller, "PocketPC 2002: 10 Minute Guide," Que Publishing, Sep. 2002, 198 pages.
NeXT Computer, "User's Guide NEXTSTEP: Object-Oriented Software," 1994, 404 pages.
Pogue, "Mac OS X The Missing Manual," (1st ed.), Pogue Press/O'Reilly & Associates, Inc., Jan. 2002, 15 pages.
Pogue, "Mac OS X The Missing Manual," (2nd ed.), Pogue Press/O'Reilly & Associates, Inc., Oct. 2002, 29 pages.
T-Mobile, "T-Mobile Sidekick Owner's Manual," Apr. 2003, 232 pages.
UMKC, "Unlock the Secrets to Telephone Etiquette," University of Missouri—Kansas City, https://www. umkc.edu/is/nt/etiquette.asp, 6 pages.
In the United States District Court for the Central District of California; BlackBerry Limited v. Facebook Inc.; [First Amended] Complaint for Patent Infringement, Case No. 2:18-cv-01844, filed Apr. 4, 2018, 160 pages.
In the United States District Court For the Central District of California; BlackBerry Limited v. Snap Inc.; BlackBerry Limited's Opposition to Defendant's Motion to Dismiss; Case No. 2:18-cv-02693-GW-KSx, Document 39, filed Jun. 28, 2018, 11 pages.
In the United States District Court For the Central District of California; BlackBerry Limited v. Snap Inc.; BlackBerry Limited's

(56) References Cited

OTHER PUBLICATIONS

Opposition to Defendants' Motions to Dismiss; Case No. 2:18-cv-02693-GW-KSx, Document 38, filed Jun. 28, 2018, 26 pages.
Certificate of Patent dated Dec. 24, 2010, issued by the Japanese Patent Office for corresponding Japanese Patent No. 4651623.
Letters Patent issued by the Korean Intellectual Property Office dated Nov. 25, 2008, for corresponding Korean Patent No. 10-0871404.
Patent Certificate for Invention dated Jul. 23, 2008, issued by the State Intellectual Property Office the P.R. Of China, for corresponding Chinese Patent Application No. 200480039930.2.
Decision to Refuse a European Patent Application, dated Sep. 9, 2008, issued by the European Patent Office for corresponding Patent Application No. 04713831.8.
Canadian Intellectual Property Office, Examiner's Requisition dated Jan. 14, 2014, issued in corresponding Canadian Patent Application No. 2,548,598.
http://www.nokia.com/EUROPE_NOKIA_COM_3/r2/support/tutorials/9210i/english/intro.html, 2002, p. 11.
Nokia 9210i Communicator, 2002, http://www.nokia.com/EUROPE_NOKIA_COM_3/r2/support/tutorials/921oi/9210/english/intro.html,PDF pp. 1-7.
Ask Search, http://www.ask.com/web?qsrc=1&o=0&l=dir&q=wireless+correspondents+new+messages.
Ask Search, http://www.ask.com/web?qsrc=1&o=0&l=dir&q=telephone+%28correspondents+or+cont...
Ask Search, http://www.ask.com/web?qsrc=1&o=0&l=dir&q=wireless+%28correspondents+or+conta...
Ask Search, http://www.ask.com/web?qsrc=1&o=0&l=dir&q=phone+%28correspondents+or+contact...
Ask Search, http://www.ask.com/web?q=correspondents+new+messages&search=&qsrc=364&o=0&l...
Examination Report dated Feb. 22, 2011, issued by the Government of Indian Patent Office for corresponding Indian Patent Application No. 3113/DELNP/2006.
International Search Report and Written Opinion dated Oct. 15, 2004, issued by the International Searching Authority for corresponding PCT Application No. PCT/CA2004/000263.
Canadian Intellectual Property Office, Examiner's Requisition dated Jul. 27, 2009, issued in Canadian Patent Application No. 2,548,598.
Canadian Intellectual Property Office, Examiner's Requisition dated Dec. 20, 2010, issued in Canadian Patent Application No. 2,548,598.
Canadian Intellectual Property Office, Examiner's Requisition dated Feb. 21, 2011, issued in Canadian Patent Application No. 2,548,598.
Canadian Intellectual Property Office, Examiner's Requisition dated Aug. 1, 2011, issued in Canadian Patent Application No. 2,548,598.
Canadian Intellectual Property Office, Examiner's Requisition dated Mar. 21, 2011, issued in Canadian Patent Application No. 2,727,763.
Canadian Intellectual Property Office, Examiner's Requisition dated Apr. 14, 2011, issued in Canadian Patent Application No. 2,732,050.
Canadian Intellectual Property Office, Notice of Allowance dated Nov. 21, 2011, issued in Canadian Patent Application No. 2,732,050.
Examiner's Search Report and Written Opinion issued by the Intellectual Priority Office of Singapore against corresponding Singapore Patent Application No. 200804162-6 dated Apr. 12, 2011.
Summons to attend Oral Proceedings Pursuant to Rule 115(1) EPC in corresponding European Patent Application No. 08168419.3 dated Feb. 17, 2011.
First, Second and Third Auxiliary Requests dated Jun. 14, 2011.
"10 Minute Guide to Pocket PC 2002"; Copyright 2003 by Que; XP007916815; ISBN 0-7897-2797-8; Library of Congress Catalog Card No. 2002103976; U.S.A.; Sep. 2002; Wiegand, G. et al.
EPO to Barker Brettell dated Aug. 22, 2011; Provision of the minutes of the oral proceedings dated Jun. 14, 2011, in accordance with Rule 124(4)EPC in corresponding European Patent Application No. 08168419.3.
EPO to Barker Brettell dated Aug. 22, 2011; Decision to refuse a European Patent application at the oral proceedings dated Jun. 14, 2011, in accordance with Rule 124(4)EPC in corresponding European Patent Application No. 08168419.3.
Notice of Allowance along with English translation of same, issued by the Japanese Patent Office in connection with corresponding Japanese Patent Application No. 2006-541762 dated Dec. 3, 2010.
United States Patent and Trademarks Office, Office Action dated Feb. 21, 2013 issued in U.S. Appl. No. 13/358,737.
United States Patent and Trademarks Office, Office Action dated Mar. 21, 2007 issued in U.S. Appl. No. 10/784,781.
United States Patent and Trademarks Office, Office Action dated Dec. 7, 2007 issued in U.S. Appl. No. 10/784,781.
United States Patent and Trademarks Office, Office Action dated Apr. 4, 2008 issued in U.S. Appl. No. 10/784,781.
United States Patent and Trademarks Office, Office Action dated Oct. 27, 2008 issued in U.S. Appl. No. 10/784,781.
United States Patent and Trademarks Office, Office Action dated Apr. 8, 2009 issued in U.S. Appl. No. 10/784,781.
United States Patent and Trademarks Office, Advisory Action Before the Filing of an Appeal Brief dated Jun. 19, 2009 issued in U.S. Appl. No. 10/784,781.
United States Patent and Trademarks Office, Office Action dated Oct. 5, 2009 issued in U.S. Appl. No. 10/784,781.
United States Patent and Trademarks Office, Office Action dated Mar. 31, 2010 issued in U.S. Appl. No. 10/784,781.
United States Patent and Trademarks Office, Office Action dated May 19, 2011 issued in U.S. Appl. No. 10/784,781.
United States Patent and Trademarks Office, Office Action dated Oct. 26, 2011 issued in U.S. Appl. No. 10/784,781.
Notice Requesting Submission of Opinion / Results of Examination dated Oct. 13, 2007, issued by the Korean Intellectual Property Office for corresponding Korean Patent Application No. 10-2006-7013025.
Notice Requesting Submission of Opinion / Results of Examination dated Apr. 10, 2008, issued by the Korean Intellectual Property Office, for corresponding Korean Patent Application No. 10-2006-7013025.
Notice of Reasons for Rejection dated Jun. 25, 2008, issued by the Japanese Patent Office for corresponding Japanese Patent Application No. 2006-541762, and English translation.
First Examination Report dated Mar. 11, 2010, issued by the Government of Indian Patent Office for corresponding Indian Patent Application No. 3113/DELNP/2006.
First Office Action dated Aug. 21, 2009, issued by the Chinese Patent Office for corresponding Chinese Patent Application No. 200810099973.X, and English translation.
Second Office Action dated Jan. 8, 2010, issued by the Chinese Patent Office for corresponding Chinese Patent Application No. 200810099973.X, and English translation.
First Office Action dated Aug. 3, 2007, issued by the Chinese Patent Office for corresponding Chinese Patent Application No. 200480039930.2.
Notification of Grant of Rights for Invention Patent dated May 26, 2010 issued by the Chinese Patent Office on Patent Application No. 200810099973.X.
Communication pursuant to Article 96(2) EPC dated Oct. 12, 2006, issued by the European Patent Office for corresponding Patent Application No. 04713831.8.
Communication pursuant to Article 94(3) EPC dated Apr. 26, 2010, issued by the European Patent Office for corresponding Patent Application No. 08168419.3.
Extended European Search Report dated Dec. 3, 2008, issued by the European Patent Office for corresponding Patent Application No. 08168419.3.
Notice of Reasons for Rejection dated Feb. 27, 2009, issued by the Japanese Patent Office for corresponding Japanese Patent Application No. 2006-541762.
Notice of Reasons for Rejection dated Jun. 17, 2010, issued by the Japanese Patent Office for corresponding Japanese Patent Application No. 2006-541762.
Summons to attend Oral Proceedings Pursuant to Rule 71(1) EPC in corresponding European Patent Application No. 04713831.8 dated Sep. 19, 2007.
Brief Communication issued by the European Patent office dated Jan. 29, 2008 in corresponding European Patent Application No. 04713831.8.

(56) References Cited

OTHER PUBLICATIONS

Extended European Search Report dated Oct. 13, 2010, issued by the European Patent Office for corresponding Patent Application No. 10177958.5.
United States District Court Central District of California, Western Division; *BlackBerry Limited v. Snap Inc.*, Case No. 2:18-cv-02693-GW (KSx); Reply to Memorandum in Support of Snap Inc.'s Motion to Dismiss Pursuant to FRCP 12(B)(6); Document 41; Filed Jul. 12, 2018; 31 Pages.
United States District Court Central District of California, Western Division; *BlackBerry Limited v. Facebook Inc., Whatsapp Inc., Instagram, Inc., and Instagram, LLC.*, Case No. 2:18-cv-01844-GW-KS; Defendants' Reply in Support of Motion to Dismiss Re Invalidity under 35 U.S.C. 101, Indirect Infringement, and Willful Infringement; Document 57-2; Filed Jul. 12, 2018; 27 Pages.
United States District Court—Central District of California, Western Division; *BlackBerry Limited v. Facebook Inc., Whatsapp Inc., Instagram, Inc. and Instagram, LLC*; Memorandum of points and authorities in support of defendants' motion to dismiss; Redacted version of document proposed to be filed under seal; Case No. 2:18-cv-01844-GW-KS, Document 31-1, filed Jun. 7, 2018, 32 pages.
United States District Court—Central District of California, Western Division; *BlackBerry Limited v. Snap Inc.*; Snap Inc.'s memorandum of points and authorities in support of its motion to dismiss pursuant to FRCP 12(B)(6); Case No. 2:18-cv-02693-GW-KS, Document 24-2, filed Jun. 7, 2018, 33 pages.
Complaint for Patent Infringement, case No. 2:18-cv-01844, filed Mar. 6, 2018, 117 pages.
In the United States District Court for the Central District of California; *BlackBerry Limited v. Snap Inc.*; Complaint for Patent Infringement, case No. 2:18-cv-02693, filed Apr. 3, 2018, 71 pages.
United States District Court Central District of California; Civil Minutes—General; *BlackBerry Limited v. Facebook, Inc. et al; BlackBerry Limited v. Snap Inc.*; Case No. CV 18-1844 GW (KSx); CV 18-2693 Gw (KSx); Aug. 21, 2018; Document 68; 28 Pages.
Communication Pursuant to Article 94(3); EP 10177958.5 dated Feb. 27, 2012.
Communication Pursuant to Article 94(3); EP 10177959.3 dated Feb. 27, 2012.
Extended European Search Report dated Oct. 13, 2010, issued by the European Patent Office for corresponding Patent Application No. 10177959.5. dated Oct. 13, 2010.
Office Action; Canadian Application No. 2548598 dated Dec. 23, 2015.
CIPO Correspondence; Canadian Application No. 2548598 Jul. 29, 2016.
CIPO Correspondence; Canadian Application No. 2548598 Jan. 22, 2017.
Bing search q=unread+contact+friend+buddy+corres Dec. 29, 2015.
Bing search q=unread+messages+contact+friend+bud Dec. 29, 2015.
Office Action; Canadian Application No. 2993726 dated Jan. 3, 2019.
Office Action; U.S. Appl. No. 13/481,379 dated Jan. 5, 2016.
Final Office Action; U.S. Appl. No. 13/481,379 dated Jul. 15, 2016.
Office Action; U.S. Appl. No. 13/481,379 dated Jan. 27, 2017.
Micheal Miller: "Ten Minute Guide to Pocket PC 2002" Internet citation; XP0024525158_http://proquest.safaribooksonline.com/0789727978/ch11.
[No Author] "Definition of Reducing by Merriam-Webster," available on or before Apr. 21, 2009, https://www.merriam-webster.com/dictionary/reducing, 2 pages.
[No Author] "Understanding Proxy Server," Microsoft Corporation, 1997, http://www.henry.k12.ga.us/echservices/files/virus/proxy2_0/msproxy/prxdocs/htm/povwps.htm, 8 pages.
A Dictionary of Computing, 4th Ed., 1997, 147-148, 215.
A Dictionary of Computing, 6th Ed., 2008, 200.
A Dictionary of Computing, 6th Ed., 2008, 253 and 363.
*Blackberry Limited v. Facebook, Inc, Whatsapp Inc., Instagram, Inc., and Instagram, LLC; Blackberry Limited v. Snap Inc.*, "Defendants' Preliminary Proposed Claim Constructions," Case No. 2:18-cv-01844; 2:18-cv-02693, dated Jan. 17, 2019, 6 pages.
*Blackberry Limited v. Facebook, Inc, Whatsapp Inc., Instagram, Inc., and Instagram, LLC; Blackberry Limited v. Snap Inc.*, "Defendants' Preliminary Proposed Claim Constructions: Exhibit A," Case No. 2:18-cv-01844; 2:18-cv-02693, dated Jan. 17, 2019, 3 pages.
*Blackberry Limited v. Facebook, Inc, Whatsapp Inc., Instagram, Inc., and Instagram, LLC; Blackberry Limited v. Snap Inc.*, "Defendants' Preliminary Proposed Claim Constructions: Exhibit B," Case No. 2:18-cv-01844; 2:18-cv-02693, dated Jan. 17, 2019, 5 pages.
*Blackberry Limited v. Facebook, Inc, Whatsapp Inc., Instagram, Inc., and Instagram, LLC; Blackberry Limited v. Snap Inc.*, "Defendants' Preliminary Proposed Claim Constructions: Exhibit C," Case No. 2:18-cv-01844; 2:18-cv-02693, dated Jan. 17, 2019, 2 pages.
*Blackberry Limited v. Facebook, Inc, Whatsapp Inc., Instagram, Inc., and Instagram, LLC; Blackberry Limited v. Snap Inc.*, "Blackberry Limited's Proposed Claim Constructions Pursuan to S.P.R. 3.2," Case No. 2:18-cv-01844; 2:18-cv-02693, dated Jan. 17, 2019, 52 pages.
*Blackberry Limited v. Facebook, Inc, Whatsapp Inc., Instagram, Inc., and Instagram, LLC; Blackberry Limited v. Snap Inc.*, "Declaraton of Aviel Rubin, Ph.D Regarding Claim Construction of the '961 Patent (with Exhibits)," Case No. 2:18-cv-01844; 2:18-cv-02693, dated Jan. 17, 2019, 40 pages.
*Blackberry Limited v. Facebook, Inc, Whatsapp Inc., Instagram, Inc., and Instagram, LLC; Blackberry Limited v. Snap Inc.*, "Declaraton of Craig Rosenberg, Ph.D Regarding Claim Construction (with Exhibits)," Case No. 2:18-cv-01844; 2:18-cv-02693, dated Jan. 17, 2019, 38 pages.
*Blackberry Limited v. Facebook, Inc, Whatsapp Inc., Instagram, Inc., and Instagram, LLC; Blackberry Limited v. Snap Inc.*, "Declaraton of Joseph J. LaViola, Jr., Ph.D Regarding Claim Construction (with Exhibits)," Case No. 2:18-cv-01844; 2:18-cv-02693, dated Jan. 17, 2019, 57 pages.
*Blackberry Limited v. Facebook, Inc, Whatsapp Inc., Instagram, Inc., and Instagram, LLC; Blackberry Limited v. Snap Inc.*, "Declaraton of Kevin Almeroth, Ph.D Regarding Claim Construction (with Exhibits)," Case No. 2:18-cv-01844; 2:18-cv-02693, dated Jan. 17, 2019, 119 pages.
*Blackberry Limited v. Facebook, Inc, Whatsapp Inc., Instagram, Inc., and Instagram, LLC; Blackberry Limited v. Snap Inc.*, "Declaraton of Patrick McDaniel, Ph.D Regarding Claim Construction (with Exhibits)," Case No. 2:18-cv-01844; 2:18-cv-02693, dated Jan. 17, 2019, 62 pages.
Building Internet Firewalls, 2nd Ed., Jun. 2000, 542 pages.
Coding Theory and Cryptography: the essentials, 2nd Ed., 2000, 94 and 237.
Collins Dictionary, William Collins Sons & Co. Ltd and HarperCollins Publishers, Tenth Edition, 2009, 1299, 1378.
Collins Dictionary, William Collins Sons & Co. Ltd and HarperCollins Publishers, Tenth Edition, 2009, 16, 457, 837, and 948-949.
Collins Dictionary, William Collins Sons & Co. Ltd and HarperCollins Publishers, Tenth Edition, 2009, 16, 458.
Collins Dictionary, William Collins Sons & Co. Ltd and HarperCollins Publishers, Tenth Edition, 2009, 823.
Comprehensive Dictionary of Electrical Engineering, 2nd Ed., 2005, 351.
Developing User Interfaces, "Graphical Interfaces," 1993, 85.
Dictionary of Computer Science, Engineering, and Technology, 2000, 142, 214, 235.
Dictionary of Computer Science, Engineering, and Technology, 2000, 188.
Dictionary of Computer Science, Engineering, and Technology, 2000, 71, 102, and 503-504.
FOLDOC, "mod," Jul. 1999, http://foldoc.org/, 2 pages.
FOLDOC, "modulo operator," Jul. 1999, http://foldoc.org/, 2 pages.
Foundations on Cryptography, vol. I Basic Tools, "3.3.1. Standard Definition of Pseudorandom Generators," 2001, 4 pages.
Hansson et al., "Subtle and Public Notification Cues for Mobile Devices," International Conference on Ubiquitous Computing, Sep. 2001, 240-246.
Hargrave's Communications Dictionary, 2001, 234, 253.
Hargrave's Communications Dictionaiy, 2001, 234, 543.

(56) References Cited

OTHER PUBLICATIONS

Human-Computer Interaction, 1994, 94-95.
IEEE 100 The Authoritative Dictionary of IEEE Standards Terms, 7th Ed., 2000, 281.
IEEE 100 The Authoritative Dictionary of IEEE Standards Terms, 7th Ed., 2000, 346-348.
IEEE 100 The Authoritative Dictionary of IEEE Standards Terms, 7th Ed., 2000, 556-557.
IEEE 100 The Authoritative Dictionary of IEEE Standards Terms, 7th Ed., 2000, 585.
IEEE 100 The Authoritative Dictionary of IEEE Standards Terms, 7th Ed., 2000, 700.
IEEE 100 The Authoritative Dictionary of IEEE Standards Terms, 7th Ed., 2000, 706.
IEEE 100 The Authoritative Dictionary of IEEE Standards Terms, 7th Ed., 2000, 1103-1105.
IEEE The Authoritative Dictionary of IEEE Standards Terms, 7th Ed., 2000, 346-348.
Jackson et al., "Reducing the Effect of Email Interruptions on Employees," Int J Information Management, 2003, 23: 55-65.
Liu et al., "Software Timing Analysis Using HW/SW Cosimulation and Instmction Set Simulator," IEEE Hardware/Sofware Codesign, 1998, 65-69.
Longman Dictionary of American English, 4th Ed., 2008, 11, 583-584.
Longman Dictionary of American English, 4th Ed., 2008, 787 and 846.
Maltzahn et al., "Reducing the Disk I/O of Web Proxy Server Caches," Proceedings of the 1999 USENIX Annual Techmeal Conference, Jun. 1999, 15 pages.
McGraw-Hill Dictionary of Scientific and Technical Terms, 6th Ed., 2003, 628, 922, 1046.
McGraw-Hill Dictionary of Scientific and Technical Terms, 6th Ed., 2003, 812, 2180, 1357-1358.
Merriam-Webster's Collegiate Dictionary, 10th Ed., 1997, 260.
Merriam-Webster's Collegiate Dictionary, 10th Ed., 1997, 980-981.
Merriam-Webster's Collegiate Dictionary, 11 Ed., 2005, 12, 340, 634, and 715-715.
Merriam-Webster's Collegiate Dictionary, 11th Ed., 2005, 340.
Merriam-Webster's Collegiate Dictionary, 11th Ed., 2005, 619.
Merriam-Webster's Collegiate Dictionary, 11th Ed., 2005, 977-978 and 1004.
Microsoft Computer Dictionary, 5th Ed., 2002, 131, 421, 166-167, 239, 263-264, 541, 555-556, 572-573.
Microsoft Computer Dictionary, 5th Ed., 2002, 154, 274-275, and 285.
Microsoft Computer Dictionary, 5th Ed., 2002, 216.
Microsoft Computer Dictionary, 5th Ed., 2002, 344.
Microsoft Computer Dictionary, 5th Ed., 2002, 346 and 471.
Microsoft Press Computer Dictionary, 3rd Ed., 1997, 192 and 387.
Microsoft Press Computer Dictionary, 3rd Ed., 1997, 86, 115 and 477.
Modem Dictionary of Electronics, 7th Ed., 1999, 109, 149, and 802-803.
Modem Dictionary of Electronics, 7th Ed., 1999, 276-277 and 785.
Newton's Dictionary of Electronics, Jul. 2000, 352, 711-712, and 799-800.
Newton's Telecom Dictionary, 16.5th Ed., 2000, 277, 400, 437.
Newton's Telecom Dictionary, 16.5th Ed., 2000, 403.
Random House Webster's College Dictionary, 2nd Ed., 2000, 1108.
Random House Webster's Computer & Internet Dictionary, 3rd Ed., 1999, 164, 237-238, 267-268.
Random House Webster's Computer & Internet Dictionary, 3rd Ed., 1999, 216.
Same as BB_Facebook00076625.
The American Heritage College Dictionary, 4th Ed., 2002, 321.
The Computer Glossary: the Complete Illustrated Dictionary, 7th Ed., 1981, 190.
The IEEE Standard Dictionaiy of Electrical and Electronics Terms, 1996, 146, 209, and 1145.
The IEEE Standard Dictionary of Electrical and Electronics Terms, 1996, 396, 551, 989, and 1115.
Webster's New World Computer Dictionary, 10th Ed., 2003, 145.
Webster's New World Dictionary of Computer Terms, 8th Ed., 2000, 540.
Wiley Encyclopedia of Computer Science and Engineering, vol. 3, 2009, 1464.
Wolfram MathWorld, "Seed," available on or before May 5, 2008, http://mathworld.wolfram.com/Seed.html, 2 pages.
Miller M: "10 Minute Guide to Pocket PC 2002 Passage", Sep. 1, 2002, 10 Minute Guide to Pocket PC, Que, US, pp. 1, 4, 14, 18, 60, 134-135, 148, XP007916815.
Communication Pursuant to Article 94(3) EPC; EP 10 177 958.5; dated May 9, 2018.
Communication Pursuant to Article 94(3) EPC; EP 10 177 959.3; dated May 9, 2018.
Summons to Oral Proceedings pursuant to Rule 115(1) EPC; EP 08168419.3; Oct. 30, 2017.
Affidavit of Christopher Butler, https://web.archive.org/web/20010806175758/http://www.blackberry.net/solutions/enterprise/handhelds/specifications/html, dated Apr. 1, 2019, 3 pages.
Blackberry Limited v. Facebook, Inc., et al., "First Amended Complaint for Patent Infringement," Case 2:18-CV-01844 (C.D. Cal.), U.S. Pat. No. 8,209,634, dated Apr. 4, 2018, 160 pages.
Blackberry Limited v. Facebook, Inc., et al., "Proof of Service," Case 2:18-CV-01844 (C.D. Cal.), U.S. Pat. No. 8,209,634, dated Apr. 9, 2018, 4 pages.
Blackberry Limited v. Facebook, Inc., Whatsapp Inc., Instagram, Inc. and Instagram,LLC; Blackberry Limited v. Snap Inc., "[Proposed] Order Granting Defendants' Motion to Stay Pending Inter Partes Review," Case 2:18-CV-01844-GW-KS; 2:18-CV-02693-GW-KS, Apr. 16, 2019, 2 pages.
Blackberry Limited v. Facebook, Inc., Whatsapp Inc., Instagram, Inc. and Instagram,LLC; Blackberry Limited v. Snap Inc., "Civil Minutes—General," Case 2:18-CV-01844-GW-KS; 2:18-CV-02693-GW-KS, Apr. 1, 2019, 41 pages.
Blackberry Limited v. Facebook, Inc., Whatsapp Inc., Instagram, Inc. and Instagram,LLC; Blackberry Limited v. Snap Inc., "Civil Minutes—General," Case 2:18-CV-01844-GW-KS; 2:18-CV-02693-GW-KS, Apr. 5, 2019, 51 pages.
Blackberry Limited v. Facebook, Inc., Whatsapp Inc., Instagram, Inc. and Instagram,LLC; Blackberry Limited v. Snap Inc., "Civil Minutes—General," Case 2:18-CV-01844-GW-KS; 2:18-CV-02693-GW-KS, Mar. 27, 2019, 4 pages.
Blackberry Limited v. Facebook, Inc., Whatsapp Inc., Instagram, Inc. and Instagram,LLC; Blackberry Limited v. Snap Inc., "Civil Minutes—General: Markman Hearing," Case 2:18-CV-01844-GW-KS; 2:18-CV-02693-GW-KS, Apr. 1, 2019, 41 pages.
Blackberry Limited v. Facebook, Inc., Whatsapp Inc., Instagram, Inc. and Instagram,LLC; Blackberry Limited v. Snap Inc., "Claim Construction Hearing," Case 2:18-CV-01844-GW-KS; 2:18-CV-02693-GW-KS, Apr. 1, 2019, 67 pages.
Blackberry Limited v. Facebook, Inc., Whatsapp Inc., Instagram, Inc. and Instagram,LLC; Blackberry Limited v. Snap Inc., "Defendants' Memorandum of Points and Authorities in Support of Motion to Stay Pending Inter Partes Review," Case 2:18-CV-01844-GW-KS; 2:18-CV-02693-GW-KS, Apr. 16, 2019, 31 pages.
Blackberry Limited v. Facebook, Inc., Whatsapp Inc., Instagram, Inc. and Instagram,LLC; Blackberry Limited v. Snap Inc., "Defendants' Notice and Motion to Stay Pending Inter Partes Review," Case 2:18-CV-01844-GW-KS; 2:18-CV-02693-GW-KS, Apr. 16, 2019, 5 pages.
Blackberry Limited v. Facebook, Inc., Whatsapp Inc., Instagram, Inc. and Instagram,LLC; Blackberry Limited v. Snap Inc., "Defendant's Presentation," Case 2:18-CV-01844-GW-KS; 2:18-CV-02693-GW-KS, Apr. 1, 2019, 161 pages.
Blackberry Limited v. Facebook, Inc., Whatsapp Inc., Instagram, Inc. and Instagram,LLC; Blackberry Limited v. Snap Inc., "Joint Report in Response to Court Minute Order Regarding Disputed Claim Terms," Case 2:18-CV-01844-GW-KS; 2:18-CV-02693-GW-KS, Mar. 28, 2019, 12 pages.
Blackberry Limited v. Facebook, Inc., Whatsapp Inc., Instagram, Inc. and Instagram,LLC; Blackberry Limited v. Snap Inc., "Joint

(56) References Cited

OTHER PUBLICATIONS

Statement Regarding Disputed Claim Terms," Case 2:18-CV-01844-GW-KS; 2:18-CV-02693-GW-KS, Mar. 26, 2019, 12 pages.
*Blackberry Limited v. Facebook, Inc., Whatsapp Inc., Instagram, Inc. and Instagram,LLC; Blackberry Limited v. Snap Inc.*, "Tutorial Hearing Transcript," Case 2:18-CV-01844-GW-KS; 2:18-CV-02693-GW-KS, Mar. 21, 2019, 154 pages.
Crumlish, The ABCs of the Internet, 1996, pp. 1-43.
Dvorak, "Scarier than Spam," PC Magazine, Jan. 19, 1999, 87.
*Facebook, Inc., Instagram, LLC and Whatsapp Inc, v. Blackberry Limited*, "Declaration of Sylvia Hall-Ellis Ph.D.," IPR2019-00924, dated Mar. 31, 2019, 206 pages.
*Facebook, Inc., Instagram, LLC and Whatsapp Inc. v. Blackberry Limited*, Declaration of Sandeep Chatterjee, Ph.D., Case No. IPR2019-00924, U.S. Pat. No. 8,209,634, dated Apr. 3, 2019, 139 pages.
*Facebook, Inc., Instagram, LLC and Whatsapp Inc. v. Blackberry Limited*, Petition for Inter Partes Review, Case No. IPR2019-00924, U.S. Pat. No. 8,209,634, dated Apr. 4, 2019, 80 pages.
*Facebook, Inc., Instagram, LLC and Whatsapp Inc. v. Blackberry Limited*, Petition for Inter Partes Review, Case No. IPR2019-00925, U.S. Pat. No. 8,209,634, dated Apr. 4, 2019, 80 pages.
*Facebook, Inc., Instagram, LLC and Whatsapp Inc. v. Blackberry Limited*, Redline comparison between U.S. Pat. No. 7,281,215 B1 (Ex. 1004), Case No. IPR2019-00924, U.S. Pat. No. 8,209,634, dated Apr. 4, 2019, 21 pages.
Manes, "A Pocketful of Windows," Forbes, Oct. 29, 2001, 2 pages.
McPherson, How to Do Everything with Your Pocket PC, 2nd Ed., 2002, pp. 2-70, 142-193, 365-388 and 411-423.
Microsoft Computer Dictionary, 5th ed., 2002, pp. 97, 266, 396, and 572.
Nokia 9210i Communicator, <www.nokia.com>, 2002, 8 pages.
Random House Webster's College Dictionary, 2000, p. 1049.
Schwartz, The Complete Idiot's Guide to Online Dating and Relating, 1999, Chapter 13, 171-183.
Strom, "Three New Wireless E-Mail Devices," Computerworld, Nov. 8, 1999, p. 63.
USPTO Transaction history for U.S. Appl. No. 10/784,781, U.S. Pat. No. 8,209,634, filed Jun. 26, 2012, 877 pages.
*Blackberry Limited v. Facebook, Inc., et al.*, "Blackberry's Opening Claim Construction Brief," Case Nos. 2:18-CV-01844-GW-KS (Lead Consolidated Case) and 2:18-CV-02693-GW-KS (C.D. Cal.), Mar. 21, 2019, 47 pages.
Exhibit 634.1: Response to U.S. Office Action in U.S. Appl. No. 10/784,781 (now U.S. Pat. No. 8,209,634), dated Sep. 8, 2011, 28 pages.
Exhibit 634.2: *Blackberry Limited v. Snap Inc.*, "Highly Confidential Subject to Protective Order Video-recorded Deposition of Mehrdad Jahangiri," Case Nos. 2:18-CV-01844-GW-KS (Lead Consolidated Case) and 2:18-CV-02693-GW-KS (C.D. Cal.), dated Jan. 30, 2019, 4 pages.
Exhibit 713.1: *Blackberry Limited v. Snap Inc.*, "Videotaped Deposition Upon Oral Examination of Craig Rosenberg," Case Nos. 2:18-CV-01844-GW-KS (Lead Consolidated Case) and 2:18-CV-02693-GW-KS (C.D. Cal.), dated Feb. 8, 2019, 4 pages.
Exhibit 961.11 Response to U.S. Office Action in U.S. Appl. No. 10/025,924, dated Jul. 26, 2006, 8 pages.
Exhibit 961.12 IEEE 100 The Authoritative Dictionary of IEEE Standards Terms, 7th Ed., 2000, 7 pages.
Exhibit 961.14 The Computer Glossary: the Complete Illustrated Dictionary, 9th Ed., 1981, 150 and 252.
Exhibit 961.8 Merriam Webster's Collegiate Dictionary, 11th ed, 2005, 1004.
*Blackberry Limited v. Facebook, Inc., et al.*, "Declaration Of Jeff Nardinelli In Support Of Blackberry's Opening Claim Construction Brief," Case Nos. 2:18-CV-01844-GW-KS (Lead Consolidated Case) and 2:18-CV-02693-GW-KS (C.D. Cal.), Mar. 21, 2019, 3 pages.
*Blackberry Limited v. Facebook, Inc., et al.*, "Blackberry's Responsive Claim Construction Brief," Case Nos. 2:18-CV-01844-GW-KS (Lead Consolidated Case) and 2:18-CV-02693-GW-KS (C.D. Cal.), Mar. 18, 2019, 23 pages.
*Blackberry Limited v. Facebook, Inc., et al.*, "Declaration of Jeff Nardinelli in Suport of Blackberry's Responsive Claim Construction Brief," Case Nos. 2:18-CV-01844-GW-KS (Lead Consolidated Case) and 2:18-CV-02693-GW-KS (C.D. Cal.), Mar. 18, 2019, 3 pages.
*Blackberry Limited v. Facebook, Inc., et al.*, "Rebuttal Declaration of Aviel Rubin, Ph.D regarding Claim Construction of the '961 Patent," Case Nos. 2:18-CV-01844-GW-KS (Lead Consolidated Case) and 2:18-CV-02693-GW-KS (C.D. Cal.), Mar. 18, 2019, 3 pages.
*Blackberry Limited v. Facebook, Inc., et al.*, "Rebuttal Declaration of Craig Rosenberg, Ph.D regarding Claim Construction," Case Nos. 2:18-CV-01844-GW-KS (Lead Consolidated Case) and 2:18-CV-02693-GW-KS (C.D. Cal.), Mar. 18, 2019, 3 pages.
*Blackberry Limited v. Facebook, Inc., et al.*, "Rebuttal Declaration of Joseph Laviola, Ph.D regarding Claim Construction," Case Nos. 2:18-CV-01844-GW-KS (Lead Consolidated Case) and 2:18-CV-02693-GW-KS (C.D. Cal.), Mar. 18, 2019, 4 pages.
*Blackberry Limited v. Facebook, Inc., et al.*, "Rebuttal Declaration of Kevin Almeroth, Ph.D regarding Claim Construction," Case Nos. 2:18-CV-01844-GW-KS (Lead Consolidated Case) and 2:18-CV-02693-GW-KS (C.D. Cal.), Mar. 19, 2019, 7 pages.
*Blackberry Limited v. Facebook, Inc., et al.*, "Supplemental Declaration of Patrick McDaniel, Ph.D regarding Claim Construction," Case Nos. 2:18-CV-01844-GW-KS (Lead Consolidated Case) and 2:18-CV-02693-GW-KS (C.D. Cal.), Mar. 18, 2019, 6 pages.
Exhibit 120.1 *Facebook, Inc., Instagram, LLC and Whatsapp Inc., v. Blackberry Limited*, "Declaration of Sandeep Chatterjee," IPR Review of U.S. Pat. No. 9,349,120B2, dated Feb. 18, 2019, 154 pages.
Exhibit 327.1 *Blackberry Limited v. Snap Inc.*, "Videotaped Deposition of Patrick McDaniel, Ph.D,", Case 2:18-CV-02693-GW-KS (C.D. Cal.), dated Feb. 5, 2019, 18 pages.
Exhibit 351.1 IEEE 100 The Authoritative Dictionary of IEEE Standards Terms, 7th Ed., 2000, 207 and 1031.
Exhibit 351.2 Modern Dictionary of Electronics, 7th Ed., 1999, 142 and 683.
Exhibit 351.3 Dictionary of Networking 3rd Ed., 1999, 336-337.
Exhibit 634.3 Collected Dictionary Definitions of Icon, McGraw-Hill Dictionary of Scientific and Technical Terms, 6th Ed., 2003, 1046; Hargrave's Communication Dictionary, 2001, 253; Dictionary of Computer Science, Engineering, and Technology, 2001, 235; Newton's Telecom Dictionary, Sixteenth and a Half Ed., 2000, 437; The Computer Glossary, 7thEd., 1995, 190; Random House Webster's Computer & Internet Dictionary, 3rd Ed., 1999, 267-268.
Exhibit 634.4 Response to U.S. Office Action in U.S. Appl. No. 10/784,781, dated Jan. 28, 2008, 11 pages.
Exhibit 929.1 Weaver, "Signposts to Oblivion? Meta-Tags signal the Judiciary to stop commercial internet regulation and yield to the electronic marketplace," Seattle University Law Review: Regulating Meta Tags, 1998, 22: 667-694.
*Blackberry Limited v. Facebook, Inc., et al.*, "Blackberry's Technology Tutorial and Claim Construction Presentation," Case Nos. 2:18-CV-01844-GW-KS (Lead Consolidated Case) and 2:18-CV-02693-GW-KS (C.D. Cal.), Mar. 18, 2019, 3 pages.
*Blackberry Limited v. Facebook, Inc., et al.; Blackberry Limited v. Snap Inc.*, "BlackBerry's Technology Tutorial," Case Nos. 2:18-CV-01844-GW-KS (Lead Consolidated Case) and 2:18-CV-02693-GW-KS (C.D. Cal.), Mar. 21, 2019, 112 pages [slides].
*Blackberry Limited v. Facebook, Inc., et al.; Blackberry Limited v. Snap Inc.*, "Claim Construction Hearing," Case Nos. 2:18-CV-01844-GW-KS (Lead Consolidated Case) and 2:18-CV-02693-GW-KS (C.D. Cal.), Mar. 21, 2019, 238 pages [slides].
*Blackberry Limited v. Facebook, Inc., et al.*, "Declaration of Matthew J. Brigham in Support of Defendants' Responsive Claim Construction Brief (Common Patents)," Case Nos. 2:18-CV-01844-GW-KS (Lead Consolidated Case) and 2:18-CV-02693-GW-KS (C.D. Cal.), Mar. 18, 2019, 2 pages.
*Blackberry Limited v. Facebook, Inc., et al.*, "Defendants' Responsive Claim Construction Brief (Common Patents)," Case Nos. 2:18-CV-01844-GW-KS (Lead Consolidated Case) and 2:18-CV-02693-GW-KS (C.D. Cal.), Mar. 18, 2019, 14 pages.

(56) References Cited

OTHER PUBLICATIONS

Exhibit A *Blackberry Limited* v. *Snap Inc.*, "Videotaped Deposition of Kevin Almeroth, Ph.D,"", Case 2:18-CV-02693-GW-KS (C.D. Cal.), dated Feb. 6, 2019, 13 pages.
Exhibit B *Blackberry Limited* v. *Snap Inc.*, "Videotaped Deposition of Joseph Laviola, Jr.,"", Case 2:18-CV-02693-GW-KS (C.D. Cal.), dated Feb. 6, 2019, 9 pages.
Exhibit C *Blackberry Limited* v *Snap Inc.*, "Videotaped Deposition Upon Oral Examination of Craig Rosenberg.,", Case 2:18-CV-01844-GW-KS (C.D. Cal.), dated Feb. 8, 2019, 7 pages.
Exhibit 20 Dictionary of Computer and Internet Terms, 6th Ed., 1998, 376.
Exhibit 21 Random House Concise Dictionary of Science & Computers, 2004, 519.
Exhibit 22 *Blackberry Limited* v. *Facebook, Inc. et al.; Blackberry Limited* v. *Snap Inc.*, "Declaration of Kevin Almeroth, Ph.D regarding Claim Construction," Case No. 2:18-CV-002693 GW-KS, Jan. 17, 2019, 5 pages.
Exhibit 23 *Blackberry Limited* v. *Facebook, Inc. et al.; Blackberry Limited* v. *Snap Inc.*, "Videotaped Deposition of Kevin Almeroth, Ph.D ," Case No. 2:18-CV-02693 GW-KS, Feb. 6, 2019, 8 pages.
Exhibit 24 Microsoft Computer Dictionaiy, 4th Ed., 1999, 288, 289, and 435.
Exhibit 25 Dictionary of Computer and Internet Words, 2001, 172.
*Blackberry Limited* v. *Facebook, Inc., et al.*, "Declaration of Matthew J. Brigham in Support of Defendants' Opening Claim Construction Brief for Common Patents," Case Nos. 2:18-CV-01844-GW-KS, Feb. 28, 2019, 4 pages.
*Blackberry Limited* v. *Facebook, Inc., et al.*, "Declaration of Matthew J. Brigham in Support of Facebook Defendants' Opening Claim Consttuction Brief (Facebook—Only Patents)," Case No. 2:18-CV-01844-GW-KS (C.D. Cal.), Feb. 28, 2019, 3 pages.
*Blackberry Limited* v. *Facebook, Inc., et al.*, "Defendants' Opening Claim Construction Brief for Common Patents," Case Nos. 2:18-CV-01844-GW-KS (Lead Consolidated Case) and 2:18-CV-02693-GW-KS (C.D. Cal.), Feb. 28, 2019, 29 pages.
*Blackberry Limited* v. *Facebook, Inc., et al.*, "Facebook Defendants' Opening Claim Construction Brief (Facebook—Only Patents),"" Case No. 2:18-CV-01844-GW-KS (C.D. Cal.), Feb. 28, 2019, 11 pages.
Exhibit 1 Applied Cryptography, 2nd Ed., 1996, 242-243.
Exhibit 10 Merriam Webster's Collegiate Dictionary, 11th ed, 2005, 795.
Exhibit 10 Response to U.S. Office Action in U.S. Appl. No. 10/784,781, dated Jan. 28, 2008, 11 pages.
Exhibit 11 The American Heritage College Dictionary, 4th Ed., 2002, 951.
Exhibit 11 U.S. Office Action in U.S. Appl. No. 10/784,781, dated Apr. 4, 2008, 14 pages.
Exhibit 12 Response to U.S. Office Action in U.S. Appl. No. 10/784,781, dated Jan. 22, 2009, 11 pages.
Exhibit 13 U.S. Office Action in U.S. Appl. No. 10/784,781, dated Apr. 8, 2009, 17 pages.
Exhibit 14 Response to U.S. Office Action in U.S. Appl. No. 10/784,781, dated Jun. 5, 2009, 11 pages.
Exhibit 15 Response to U.S. Office Action in U.S. Appl. No. 10/784,781, dated Jul. 8, 2009, 17 pages.
Exhibit 16 "Chapter 1: Getting to know your handheld," Blackberry Wireless Handheld User Manual, 2003, 34-38.
Exhibit 17 "Chapter 8: Reference," Blackberry Wireless Handheld User Manual, 2003, 135-139.
Exhibit 18 *Blackberry Limited* v. *Facebook, Inc, et al.* "Declaraton of Craig Rosenberg, Ph.D Regarding Claim Construction," Case No. 2:18-cv-01844; 2:18-cv-02693, dated Jan. 17, 2019, 5 pages.
Exhibit 19 *Blackberry Limited* v. *Facebook, Inc., et al.*, "Videotaped Deposition Upon Oral Examination of Craig Rosenberg," Case Nos. 2:18-CV-01844-GW-KS (Lead Consolidated Case) and 2:18-CV-02693-GW-KS (C.D. Cal.), Feb. 8, 2019, 6 pages.
Exhibit 2 *Blackberry Limited* v. *Facebook, Inc., et al.*, "Declaration of Aviel Rubin, PhD. Regarding Claim Construction of the '961 Patent," Case No. 2:18-CV-01844-GW-KS (C.D. Cal.), Jan. 17, 2019, 5 pages.
Exhibit 2 U.S. Office Action in U.S. Appl. No. 10/784,781, dated May 19, 2011, 19 pages.
Exhibit 3 Applied Cryptography, 1st Ed., 1994, 198-199.
Exhibit 3 Response to U.S. Office Action in U.S. Appl. No. 10/784,781, dated Sep. 8, 2011, 28 pages.
Exhibit 4 *Blackberry Limited* v. *Snap Inc.*, "Videotaped Deposition of Joseph Laviola, Jr.,"", Case 2:18-CV-02693-GW-KS (C.D. Cal.), dated Feb. 6, 2019, 7 pages.
Exhibit 5 *Blackberry Limited* v. *Facebook, Inc. et al.; Blackberry Limited* v. *Snap Inc.*, "Declaration of Joseph J. Laviola, Ph.D regarding Claim Construction," Case No. 2:18-CV-01844 GW-KS, Jan. 17, 2019, 7 pages.
Exhibit 5 The American Heritage College Dictionary, 4th Ed., 2002, 1129.
Exhibit 6 Illustrated Computer Dictionary for Dummies, 1993, 225.
Exhibit 6 Random House Webster's College Dictionary, 2nd Ed., 2000, 301 and 409.
Exhibit 7 *Blackberry Limited* v. *Facebook, Inc. et al.; Blackberry Limited* v. *Snap Inc.*, "Declaration of Kevin Almeroth, Ph.D regarding Claim Construction," Case No. 2:18-CV-01844 GW-KS, Jan. 17, 2019, 5 pages.
Exhibit 7 U.S. After-Final Amendment and Summary of Interview in U.S. Appl. No. 10/784,781, dated Mar. 12, 2012, 20 pages.
Exhibit 8 U.S. Notice of Allowability in U.S. Appl. No. 10/784,781, dated Mar. 18, 2012, 5 pages.
EP Summons to oral proceedings pursuan to Rule 115(1) EPC in European Application No. 10172832.7, Feb. 21, 2019 11 pages.
*Blackberry Limited* v. *Facebook, Inc., et al.*, "Declaration of Matthew J. Brigham in Support of Facebook Defendants' Responsive Claim Construction Brief (Facebook—Only Patents)," Case Nos. 2:18-CV-01844-GW-KS (C.D. Cal.), Mar. 18, 2019, 2 pages.
*Blackberry Limited* v. *Facebook, Inc., et al.*, "Defendants' Tutorial and Claim Construction Presentation (Facebook—Only Patents)," Case Nos. 2:18-CV-01844-GW-KS (C.D. Cal.), Mar. 18, 2019, 2 pages.
*Blackberry Limited* v. *Facebook, Inc., et al.*, "Facebook Defendants' Responsive Claim Construction Brief (Facebook—Only Patents)," Case Nos. 2:18-CV-01844-GW-KS, Mar. 18, 2019, 6 pages.
Exhibit A *Blackberry Limited* v. *Facebook Inc., et al.*, "Defendants' Tutorial and Claim Consttuction Presentation (Facebook—Only Patent),", Case 2:18-CV-02693-GW-KS (C.D. Cal.), dated Mar. 18, 2019, 62 pages (slides).
Exhibit B *Blackberry Limited* v. *Facebook, Inc., et al.*, "Rebuttal Declaration of Jonathan Katz, Ph.D Regarding Claim Construction of the '961 Patent," Case Nos. 2:18-CV-01844-GW-KS (C.D. Cal.), Mar. 18, 2019, 54 pages.
Exhibit C *Blackberry Limited* v. *Facebook, Inc., et al.*, "Videotaped Deposition of Kevin Almeroth, Ph.D," Case Nos. 2:18-CV-02693-GW-KS (C.D. Cal.), Feb. 6, 2019, 8 pages.
*Blackberry Limited* v. *Facebook, Inc., et al.*, "Defendants' Tutorial and Claim Construction Presentation (Common Patents)," Case Nos. 2:18-CV-01844-GW-KS (Lead Consolidated Case) and 2:18-CV-02693-GW-KS (C.D. Cal.), Mar. 21, 2019, 210 pages [slides].
*Blackberry Limited* v. *Facebook, Inc., et al.*, "Defendants' Tutorial and Claim Construction Presentation (Facebook Only Patents)," Case Nos. 2:18-CV-01844-GW-KS, Mar. 21, 2019, 61 pages [slides].
*Blackberry Limited* v. *Facebook, Inc., et al.*, "Snap's Opening Claim Construction Brief," Case Nos. 2:18-CV-01844-GW-KS (Lead Consolidated Case) and 2:18-CV-02693-GW-KS (C.D. Cal.), Feb. 28, 2019, 6 pages.
Exhibit A Claims from U.S. Pat. No. 8,326,327, Hymel et al., issued on Dec. 4, 2012, 3 pages.
Exhibit B Response to Non-Final Office Action in U.S. Appl. No. 13/648,167, dated Apr. 2, 2014, 10 pages.
*Blackberry Limited* v. *Facebook, Inc., et al.*, "Snap's Responsive Claim Construction Brief," Case Nos. 2:18-CV-01844-GW-KS (Lead Consolidated Case) and 2:18-CV-02693-GW-KS (C.D. Cal.), Mar. 18, 2019, 4 pages.

(56) References Cited

OTHER PUBLICATIONS

*Blackberry Limited* v. *Facebook, Inc., et al.,* "Snap's Tutorial and Claim Construction Presentation," Case Nos. 2:18-CV-01844-GW-KS (Lead Consolidated Case) and 2:18-CV-02693-GW-KS (C.D. Cal.), Mar. 18, 2019, 2 pages.
Exhibit A *Blackberry Limited* v. *Snap Inc.,* "Tutorial and Markman Presentation,", Case 2:18-CV-02693-GW-KS (C.D. Cal.), dated Mar. 18, 2019, 70 pages.
Summons to attend Oral Prodeedings pursuant to Rule 115(1) EPC; EP 10177958.5 Jan. 31, 2019.
Summons to attend Oral Prodeedings pursuant to Rule 115(1) EPC; EP 101779593.3 Jan. 31, 2019.
*Blackberry Limited* v. *Facebook Inc., et al.,* "Decision Granting Institution of Inter Partes Review", Case 2019-00925, U.S. Pat. No. 8,209,634, dated Oct. 16, 2019, 30 pages.
*Blackberry Limited* v. *Facebook Inc., et al.,* "Scheduling Order", Case 2019-00925, U.S. Pat. No. 8,209,634, dated Oct. 16, 2019, 10 pages.
*Blackberry Limited* v. *Facebook Inc., et al.,* "Denying Institution of Inter Partes Review", Case 2019-00924, U.S. Pat. No. 8,209,634, dated Oct. 9, 2019, 21 pages.
*Blackberry Limited* v. *Facebook Inc., et al.,* "Denying Institution of Inter Partes Review and Denying Motion of Joinder", Case 2019-00939, U.S. Pat. No. 8,209,634, dated Oct. 9, 2019, 9 pages.
*Blackberry Limited* v. *Facebook, Inc., et al.,* "Defendant's Final Election of Asserted Prior Art," Case 2:18-CV-01844-GW-KS; 2:18-CV-02693-GW-KS, U.S. Pat. No. 8,209,634, dated Jun. 14, 2019, 6 pages.
*Blackberry Limited* v. *Facebook, Inc., Whatsapp Inc., Instagram, Inc. and Instagram,LLC; Blackberry Limited* v. *Snap Inc.,* "Blackberry Limited's Final Election of Asserted Claims," Case 2:18-CV-01844-GW-KS; 2:18-CV-02693-GW-KS, filed May 31, 2019, 6 pages.
*Blackberry Limited* v. *Facebook, Inc., Whatsapp Inc., Instagram, Inc. and Instagram,LLC; Blackberry Limited* v. *Snap Inc.,* "Civil Minutes: Corrected Final Ruling on Claim Constuction / Markman Hearing," Case 2:18-CV-01844-GW-KS; 2:18-CV-02693-GW-KS, Apr. 5, 2019, 43 pages.
*Blackberry Limited* v. *Facebook, Inc., Whatsapp Inc., Instagram, Inc. and Instagram,LLC; Blackberry Limited* v. *Snap Inc.,* "Civil Minutes: In Chambers—Order," Case 2:18-CV-01844-GW-KS; 2:18-CV-02693-GW-KS, filed May 15, 2019, 3 pages.
*Blackberry Limited* v. *Facebook, Inc., Whatsapp Inc., Instagram, Inc. and Instagram,LLC; Blackberry Limited* v. *Snap Inc.,* "Civil Minutes: Status Conference," Case 2:18-CV-01844-GW-KS; 2:18-CV-02693-GW-KS, filed Apr. 22, 2019, 2 pages.
*Blackberry Limited* v. *Facebook, Inc., Whatsapp Inc., Instagram, Inc. and Instagram,LLC; Blackberry Limited* v. *Snap Inc.,* "Defendants' Notice and Motion to Stay Pending Inter Partes Review," Case 2:18-CV-01844-GW-KS; 2:18-CV-02693-GW-KS, filed Apr. 16, 2019, 38 pages.
*Blackberry Limited* v. *Facebook, Inc., Whatsapp Inc., Instagram, Inc. and Instagram,LLC; Blackberry Limited* v. *Snap Inc.,* "Notice Withdrawing Pre-Institution Motion to Stay in View of Court's Guidance," Case 2:18-CV-01844-GW-KS; 2:18-CV-02693-GW-KS, filed Apr. 26, 2019, 5 pages.
*Blackberry Limited* v. *Facebook, Inc., Whatsapp Inc., Instagram, Inc. and Instagram,LLC; Blackberry Limited* v. *Snap Inc.,* "Order Modifying Scheduling Order," Case 2:18-CV-01844-GW-KS; 2:18-CV-02693-GW-KS, filed Jul. 12, 2019, 2 pages.
*Facebook, Inc., Instagram, LLC and Whatsapp Inc.* v. *Blackberry Limited,* Declaration of Rajeev Surati, Ph.D., Case No. IPR2019-00924 / IPR2019-00925, U.S. Pat. No. 8,209,634, dated Jul. 17, 2019, 54 pages.
*Facebook, Inc., Instagram, LLC and Whatsapp Inc.* v. *Blackberry Limited,* Declaration of Rajeev Surati, Ph.D., Case No. IPR2019-00925, U.S. Pat. No. 8,209,634, dated Jul. 17, 2019, 59 pages.
*Facebook, Inc., Instagram, LLC and Whatsapp Inc.* v. *Blackberry Limited,* Patent Owner Blackberry Limited's Preliminary Response, Case No. IPR2019-00924, U.S. Pat. No. 8,209,634, dated Jul. 18, 2019, 63 pages.
*Facebook, Inc., Instagram, LLC and Whatsapp Inc.* v. *Blackberry Limited,* Patent Owner Blackberry Limited's Preliminary Response, Case No. IPR 2019-0925, U.S. Pat. No. 8,209,634, dated Jul. 18, 2019, 68 pages.
*Snap, Inc.* v. *Blackberry Limited,* Patent Owner Blackberry Limited's Preliminary Response, Case No. IPR 2019-00939, U.S. Pat. No. 8,209,634, dated Jul. 18, 2019, 63 pages.
*Snap, Inc.* v. *Blackberry Limited,* Patent Owner Blackberry Limited's Preliminary Response, Case No. IPR2019-00938, U.S. Pat. No. 8,209,634, dated Jul. 18, 2019, 68 pages.
*Snap, Inc.* v. *Blackberry Limited,* Declaration of Rajeev Surati, Ph.D., Case No. IPR 2019-00938, U.S. Pat. No. 8,209,634, dated Jul. 17, 2019, 53 pages.
*Snap, Inc.* v. *Blackberry Limited,* Declaration of Rajeev Surati, Ph.D., Case No. IPR2019-00939, U.S. Pat. No. 8,209,634, dated Jul. 17, 2019, 53 pages.
*Blackberry Limited* v. *Facebook, Inc., et al.,* "Balakrishnan Invalidity Report—Appendix C," Case Nos. 2:18-CV-01844-GW-KS, Oct. 21, 2019, 37 pages.
*Blackberry Limited* v. *Facebook, Inc., et al.,* "Balakrishnan Invalidity Report—Appendix E," Case Nos. 2:18-CV-01844-GW-KS, Oct. 21, 2019, 69 pages.
*Blackberry Limited* v. *Facebook, Inc., et al.,* "Balakrishnan Invalidity Report—Appendix G," Case Nos. 2:18-CV-01844-GW-KS, Oct. 21, 2019, 21 pages.
*Blackberry Limited* v. *Facebook, Inc., et al.,* "Balakrishnan Invalidity Report—Appendixes A-B," Case Nos. 2:18-CV-01844-GW-KS, Oct. 21, 2019, 206 pages.
*Blackberry Limited* v. *Facebook, Inc., et al.,* "Expert Report of Dan Schonfeld Ph.D Regarding Infringement of U.S. Pat. Nos. 8,677,250, 8,279,173, and 8,209,637," Case Nos. 2:18-CV-01844-GW-KS, Oct. 3, 2019, 403 pages [redacted].
*Blackberry Limited* v. *Facebook, Inc., et al.,* "Expert Report of Dan Schonfeld, Ph.D. Regarding Validity of U.S. Pat. Nos. 8,677,250, 8,279,173, and 8,209,634," Case Nos. 2:18-CV-01844-GW-KS, Oct. 3, 2019, 332 pages [redacted].
"*Blackberry Limited* v. *Facebook, Inc., et al.,* ""Expert Report of Ravin Balakrishnan, Ph.D.Regarding Invalidity of U.S. Pat. Nos. 8,209,634, 8,301,713, 8,279,173 and 9,349,120,"" Case Nos. 2:18-CV-01844-GW-KS, Oct. 21, 2019, 269 pages [redacted]".
*Blackberry Limited* v. *Facebook, Inc., et al.,* "Expert Report of Sylvia Hall-Ellis, Ph.D. Regarding Invalidity of U.S. Pat. Nos. 8,209,634, 8,301,713, 7,372,961, and 8,677,250," Case Nos. 2:18-CV-01844-GW-KS, Oct. 3, 2019, 33 pages [redacted].
McPherson, How to Do Everything with Your Pocket PC, 2nd Ed., 2002, 34 pages.
Extended European Search Report issued in European Application No. 19218825.8 dated May 29, 2020, 16 pages.
Proquest.safaribooksoneline.com[Online], "Lesson 11. Working with File and Folders" Mar. 16, 2007, [retrieved on May 26, 2020], retrieved from: URL <http://Proquest.safaribooksoneline.com/print?xmlid=0789727978/ch11>, 7 pages.
*Blackberry Limited* v. *Facebook, Inc., et al.,* Defendant's Memorandum in Support of Motion form Summary Judgment and Motion to Strike, Case 2:18-CV-01844GW, dated Jan. 7, 2020, 35 pages.
*Facebook, Inc., Instagram, LLC, and Whatsapp Inc.* v. *Blackberry Limited,* Patent Owner's Response, Case No. IPR2019-00925, U.S. Pat. No. 8,209,634, dated Feb. 11, 2020, 69 pages.
*Facebook, Inc., Instagram, LLC, and Whatsapp Inc.* v. *Blackberry Limited,* Second Declaration of Rajeev Surati, Ph.D., Case No. IPR2019-00925, U.S. Pat. No. 8,209,634, dated Feb. 10, 2020, 70 pages.
Apple iMac User's Guide, www.apple.com, 2002, 40 pages.
*Facebook, Inc., Instagram, LLC, and Whatsapp Inc.* v. *Blackberry Limited,* Deposition of Sandeep Chatterjee Ph.D., Case No. IPR2019-00925, U.S. Pat. No. 8,209,634, dated Feb. 5, 2020, 101 pages.
*Facebook, Inc., Instagram, LLC, and Whatsapp Inc.* v. *Blackberry Limited,* Patent Owner's Sur-reply, Case No. IPR2019-00925, U.S. Pat. No. 8,209,634, dated May 14, 2020, 33 pages.

(56) References Cited

OTHER PUBLICATIONS

*Facebook, Inc., Instagram, LLC, and Whatsapp Inc.* v. *Blackberry Limited*, Videoconference Deposition of Sandeep Chatterjee Ph.D., Case No. IPR2019-00925, U.S. Pat. No. 8,209,634, dated May 8, 2020, 41 pages.
*Facebook, Inc., Instagram, LLC, and Whatsapp Inc.* v. *Blackberry Limited*, Judgment: Final Written Decision, Case No. IPR2019-00925, U.S. Pat. No. 8,209,634, dated Oct. 1, 2020, 57 pages.

* cited by examiner

PREVIEWING A NEW EVENT ON A SMALL SCREEN DEVICE

CROSS-REFERENCE TO RELATED APPLICATIONS

This application is a continuation of U.S. patent application Ser. No. 13/481,379, filed May 25, 2012, which is a continuation of U.S. patent application Ser. No. 13/358,737, filed Jan. 26, 2012 (now U.S. Pat. No. 8,631,353), which is a continuation of U.S. patent application Ser. No. 10/784,781, filed Feb. 24, 2004 (now U.S. Pat. No. 8,209,634), claiming the benefit of U.S. provisional patent application Ser. No. 60/525,958, filed Dec. 1, 2003. The entire contents of each of these documents is incorporated by reference.

TECHNICAL FIELD

The present invention relates generally to wireless communication devices, and more particularly to a graphical user interface for controlling such devices.

DESCRIPTION OF THE RELATED ART

With the proliferation of communications services available on wireless mobile devices, it becomes increasingly complex to create a single device that can excel at many different functions. Many critics claim that a wireless telephone device can never make a good handheld personal digital assistant (PDA) device and a handheld PDA device will never make a good wireless telephone. It is also said that only teenagers are using Instant Messaging (IM) services or Short Message Services (SMS) to exchange messages with friends and acquaintances and that such users should get an entirely different wireless mobile device. However, many users of wireless handheld devices desire to have multiple services and functionality on a single device.

Representing multiple services and functions to a user on a single wireless mobile device presents a number of challenges to the designer of a user interface, particularly a graphical user interface (GUI), for controlling the device. Wireless devices are usually small relative to less portable computing devices such as laptops and desktop computers. Inherently then, a visual display such as an LCD or other screen component of the wireless mobile device has a small display area.

Typically, GUIs for wireless mobile devices comprise a main or home screen and one or more sub-screens that may be navigated from the main screen. Notification icons are often rendered on a portion of the main screen to indicate a new event such as the receipt of a new IM message, electronic mail (e-mail) or other service event such as a calendar reminder or alarm and other status information such as time, date and battery life. For each type of service or function available via the device, a graphical image or icon is often rendered on a major portion of the main screen, which icon may be selected using a cursor or other means to launch a specific GUI for the selected service or function.

A user may subscribe to multiple similar services and have these services available via a single wireless mobile device. For example, a user may subscribe to more than one Instant Message-type service, such as AOL™ Instant Messenger (AIM™), ICQ™, Microsoft Network™ (MSN™), Yahoo!™ Messenger and Quick Messaging™. Alternatively or as well, a user may have a corporate and personal e-mail account coupled to the wireless mobile device. When a user is notified of a new event such as a new IM message, the user is required to check each of their IM service applications separately, via their respective activation icons, to determine which IM service is responsible for the new event. Checking each service is inconvenient. Moreover, there is a demand to have information made available to a user quicker than previously available in order to optimize the control of the wireless device.

Accordingly, there is a resulting need for a method and apparatus that addresses one or more of these shortcomings.

BRIEF DESCRIPTION OF THE DRAWINGS

Embodiments of present invention will now be described by way of example with reference to attached figures, wherein.

DETAILED DESCRIPTION

Figure 1:
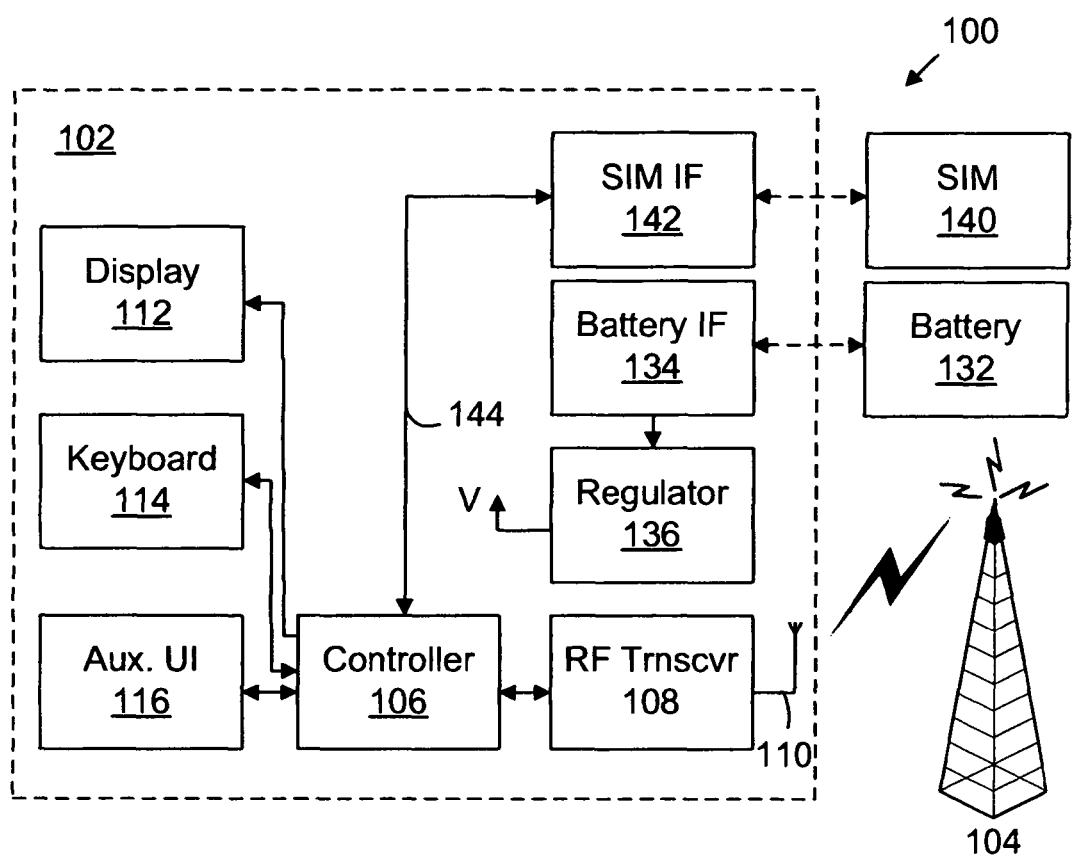
FIG. 1 is a block diagram which illustrates pertinent components of a wireless communication device which communicates within a wireless communication network in accordance with the prior art.

The invention relates to a method, graphical user interface and apparatus for notifying and previewing a new event on a display of a device.

In accordance with a first aspect of the invention, there is provided a method for a computing device having a plurality of applications for managing respective events, individual ones of said applications each represented by an application icon on a screen of a graphical user interface for the device. The method for previewing new events on the screen comprises, in response to a new event of a one of said applications, visually modifying the one of said applications' icon to notify of the new event. In response to the visually modified icon, a user may invoke the one of said applications.

The one of said applications may be monitored to determine an occurrence of the new event. Further, the first aspect may comprise determining a visual modification for the one of said applications' icon in response to the new event; and using said visual modification when visually modifying. Determining a visual modification may comprise maintaining a count of new events for the one of said applications and visually modifying the one of said applications' icon may comprise displaying a preview of a content of the new event. Displaying a preview can be responsive to a user action, such as an interaction with the modified icon. Displaying a preview of a content can comprise displaying a dialog box over a portion of the main screen.

In one embodiment, the method comprises, in response to an activation of the one of said applications having its icon visually modified to notify of the new event, automatically navigating through the one of said applications to the new event.

In one embodiment, the device comprises at least one of a data communication device and a voice communication device and at least some of said plurality of applications manage communications capabilities associated with the device. As such, the events of said at least some of said plurality of applications comprise communication events. For example, the device may be a wireless device.

In a second aspect, in a computing device having a controller coupled to a memory, the memory storing a plurality of applications for managing respective events, there is provided a graphical user interface (GUI) for the applications. The GUI comprises a main screen for displaying on the computing device, the screen comprising a plurality of icons, each icon associated with one of the plurality of applications; at least one monitoring component to determine the occurrence of new events of the applications; and at least one icon modifying component to modify a one of the icons for display on the main screen in response to a new event of the application associated with the one of the icons to notify of the new event.

In a third aspect there is provided a wireless handheld device comprising a controller; a memory coupled to the controller, the memory storing a plurality of applications for execution by the controller to manage respective events and a graphical user interface (GUI) for the applications. The GUI comprises a main screen for displaying on the device, the screen comprising a plurality of icons, each icon associated with one of the plurality of applications; at least one monitoring component to determine the occurrence of new events of the applications; and at least one icon modifying component to modify a one of the icons for display on the main screen in response to a new event of the application associated with the one of the icons to notify of the new event.

Method and apparatus for previewing new events in a computing device having a plurality of applications for managing respective events are described. Individual applications are each represented by an application icon on a screen of a graphical user interface for the device. When a new event occurs, particularly when the new event relates to a specific one of a plurality of similar applications, the invention provides a convenient way to denote which application relates to the event. In response to a new event of a one of the applications, the application's icon is visually modified to notify of the new event. A visual modification may be determined in response to the new event, for example, to preview a content of the event. The visual modification may include a count of all new events that remain to be disposed. On a selection of the visually modified icon, additional previewing may be provided. Activation of the application having a visually modified application icon may be configured to automatically initiate the application at the new event.

FIG. 1 is a block diagram of a communication system 100 which includes a mobile station 102 which communicates through a wireless communication network 104 symbolized by a station. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from the wireless network 104 over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is turned on only when it is sending to network, and is otherwise turned off or placed in a low-power mode to conserve power. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
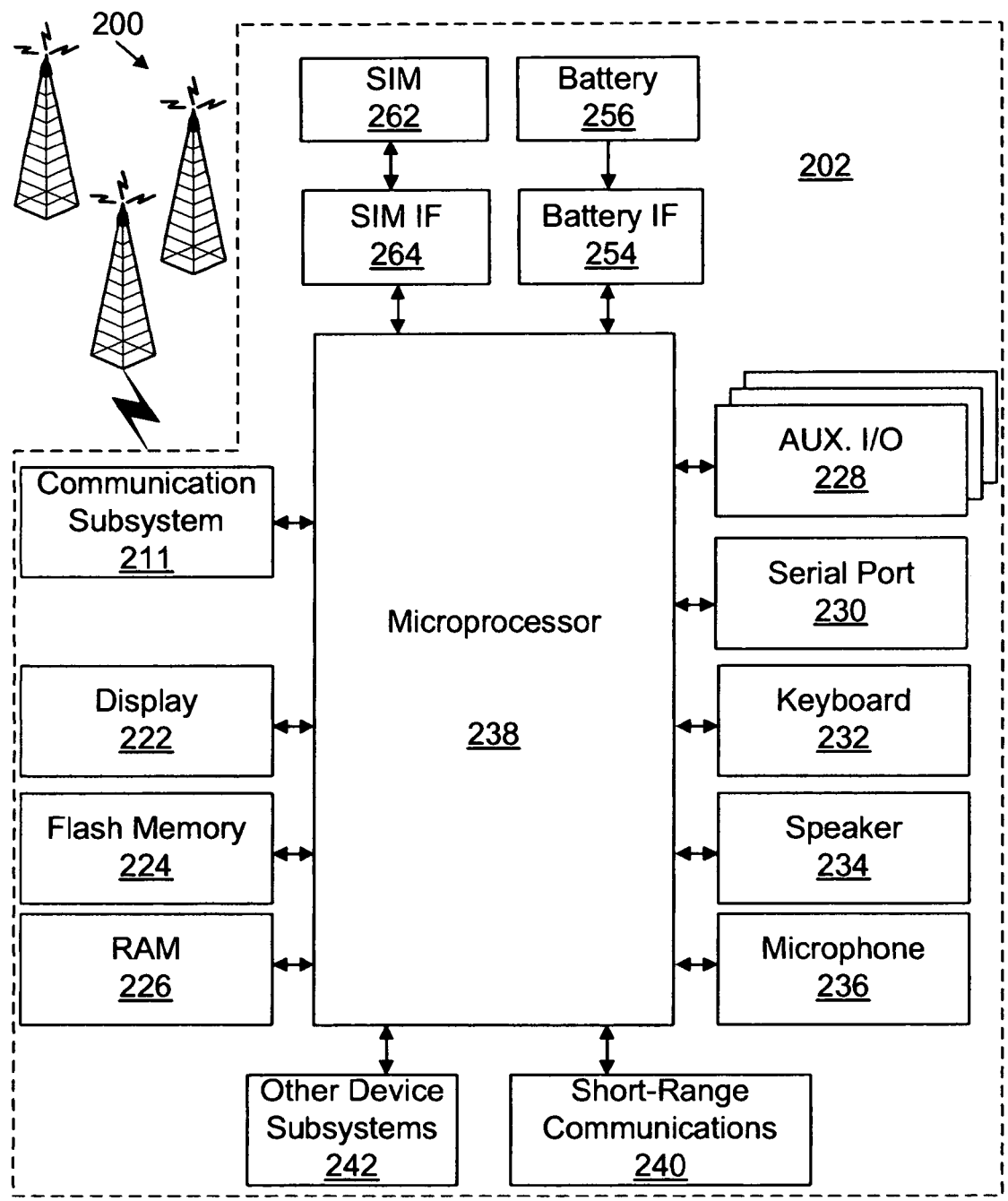
FIG. 2 is a more detailed diagram of a preferred wireless communication device of FIG. 1 in accordance with the prior art.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described further herein below with reference to FIGS. 3-9. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is configured for sending and receiving data items and includes a PIM for organizing and managing data items relating to the user such as, but not limited to, instant messaging (IM), e-mail, calendar events, calendar appointments, and task items, etc. By way of example, mobile station 202 is configured for three instant messaging services and two e-mail services to which the user subscribes. To provide a user-friendly environment to control the operation of mobile station 202, PIM together with the operation system and various software applications resident on the station 202 provides a GUI having a main screen and a plurality of sub-screens navigable from the main screen.

Figure 3:
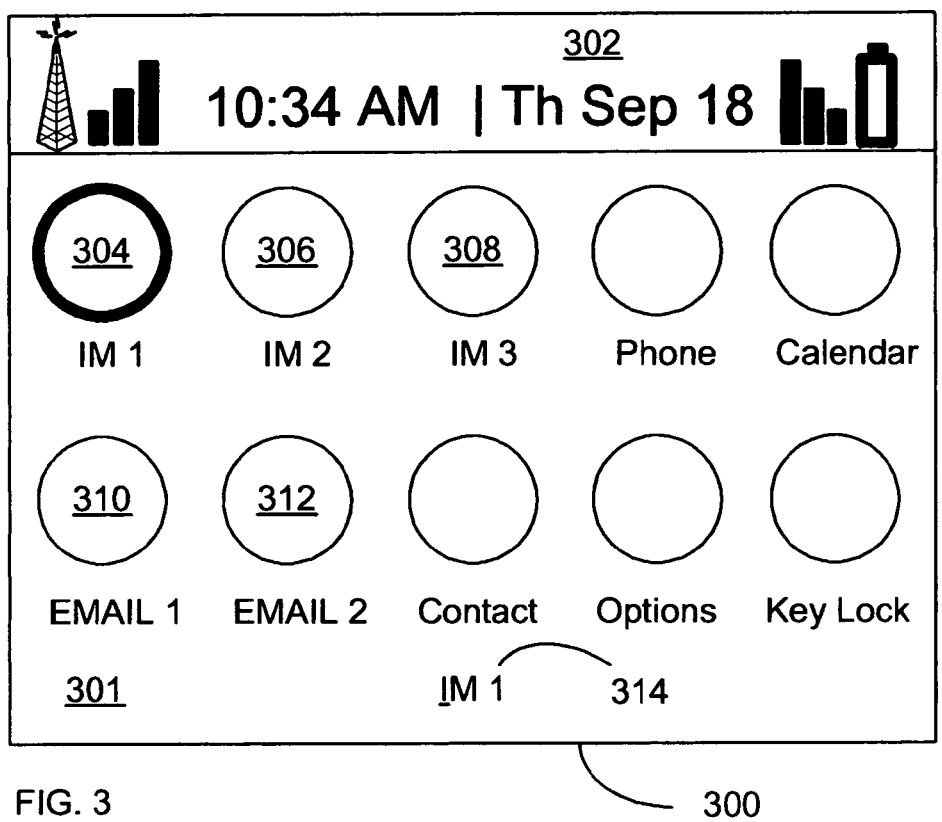
FIG. 3 is an illustration of an exemplary main screen, in accordance with the invention, for a wireless communication device such as the devices of FIGS. 1 and 2.

Referring now to FIG. 3, there is an illustration of an exemplary main screen 300, in accordance with an embodiment of the invention, for display 222 of mobile station 202 providing a graphical user interface for controlling mobile station 202. Main screen 300 is divided into two main portions, namely an application portion 301 for displaying and manipulating icons (e.g. 304-312) for various software applications and functions enabled by mobile station 202 and a mobile station status portion 302 for displaying status information such as time, date, battery and signal strength, etc. FIG. 3 illustrates three icons 304, 306 and 308 for respective IM applications IM 1, IM 2 and IM 3 and two icons 310, 312 for the two e-mail services Email 1 and Email 2. Associated with each icon is a name (e.g. IM 1) for the application for icon 304. The name may also be presented in a name region 314 of application portion 301.

Main screen 300 may not represent all application icons at once in application portion 301. A user may be required to navigate or scroll through the icons of application portion 301 to view additional application icons.

For simplicity, each icon is represented as a circle but persons of ordinary skill in the art will appreciate that other graphics may be used. In the exemplary main screen and GUI of mobile station 202, when a particular icon, e.g. 304, is selected or made active by a user (such as by manipulating keyboard 232 or other auxiliary I/O device 228), the icon 304 is changed such as by highlighting, shadowing or the like.

In accordance with an embodiment of the invention, an icon (e.g. 304) may be visually modified in response to a new event from the application associated with the icon to provide an immediate notification of the event via a change in main screen 300. The notification may distinguish the icon from icons for similar services to assist a user to control mobile station 202 as described further.

Figure 4:
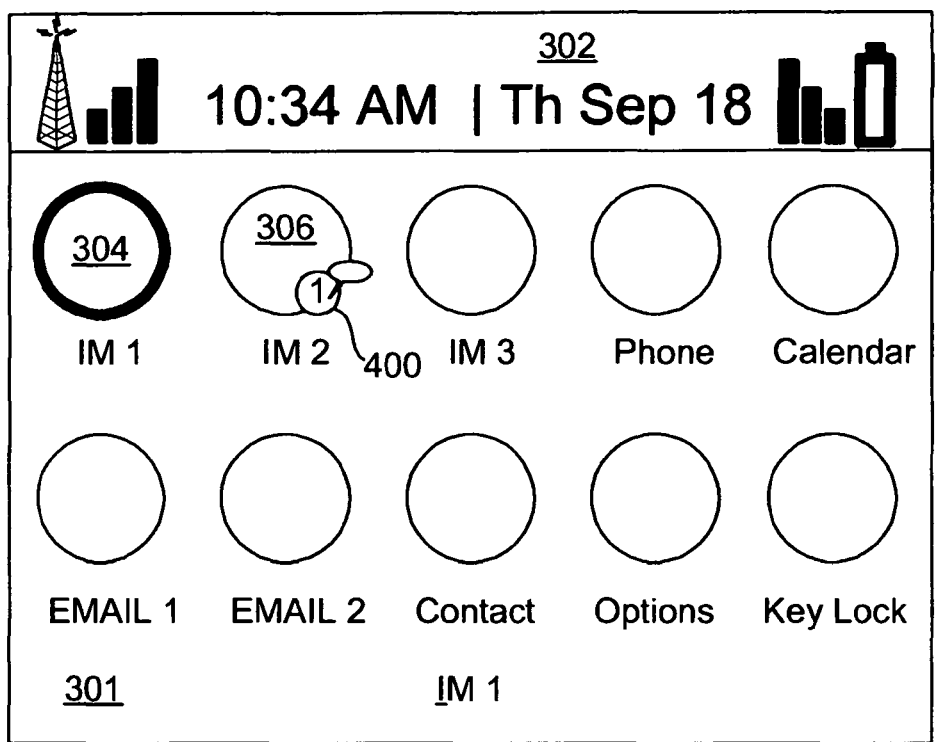
FIG. 4 is an illustration of the main screen of FIG. 3 after a new event.

Each of the icons in the main screen 300 of FIG. 3 is in an initial state indicating no new events have occurred and remain unattended by the user. FIG. 4 is an illustration of the main screen 300 after a new IM event, for example, a new message, has arrived into one of the IM applications, namely IM 2, associated with icon 306. In this exemplary embodiment, the new IM message is indicated with a visual modification 400 comprising a bubble, alluding to new received text, and a numeric indicator "1" representing a count of new events, which in this case are unread messages. Persons of ordinary skill in the art will appreciate that a visual modification 400 different from a bubble may be used and the count may represent other information, such as the number of correspondents or "buddies" from which one or more messages have been received but remain unread. In addition to indicating the number of unread messages, this mechanism may be used to reflect other new event information such as additional state information pertaining to the associated application. State information may include whether the user is currently signed in (and their user name), the state of the connection, and the current state of the user (away vs. available). In an e-mail application, such as associated with one of icons 310, 312, a count may be of unread e-mail messages or distinct senders of unread e-mail. Similar counts may represent SMS messages, appointments, alarms or other events for respective applications.

Optionally, the count may be configurable for each application or instance thereof. For application icon 304 it may identify the number of distinct senders of unread IM messages and for application icon 308 distinct unread IM messages.

Figure 5:
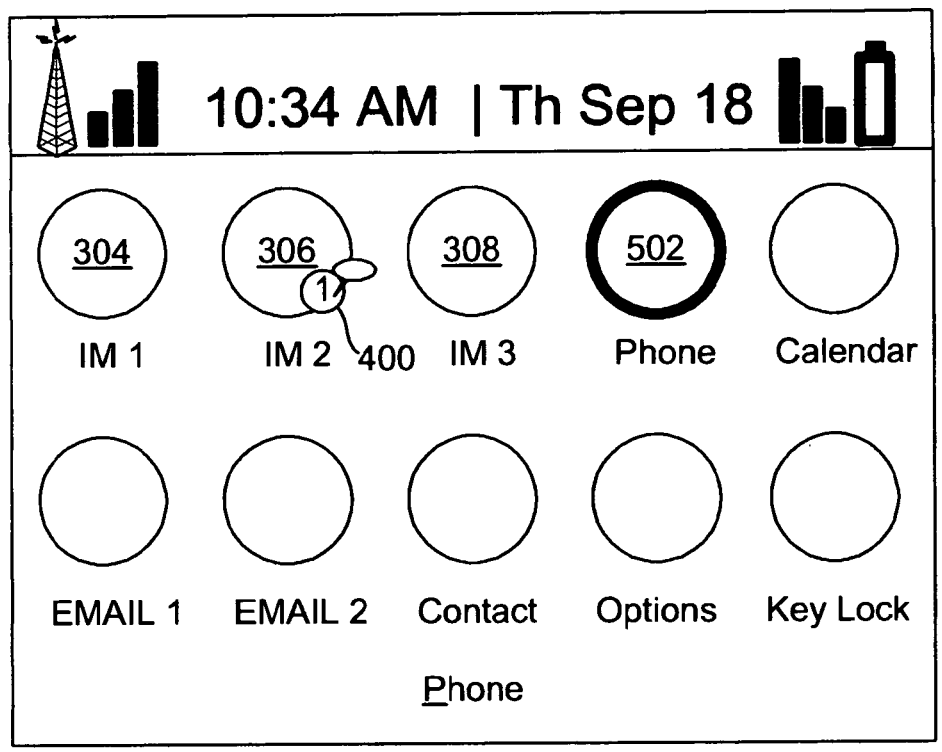
FIG. 5 is an illustration of the main screen of FIG. 4 following a user action.

FIG. 5 is an illustration of IM application icon 306 following a user action. When the user of mobile station 202 moves the focus of main screen from icon 304 through 306 and 308 to highlight phone icon 502, visual modification 400 persists at icon 306 to maintain the visual modification and remind the user of the unread message. Preferably, only once the user activates an application and reads the unread message is the visual modification changed, for example, to decrease the count and, if applicable, remove the modification if the count is zero.

Figure 6:
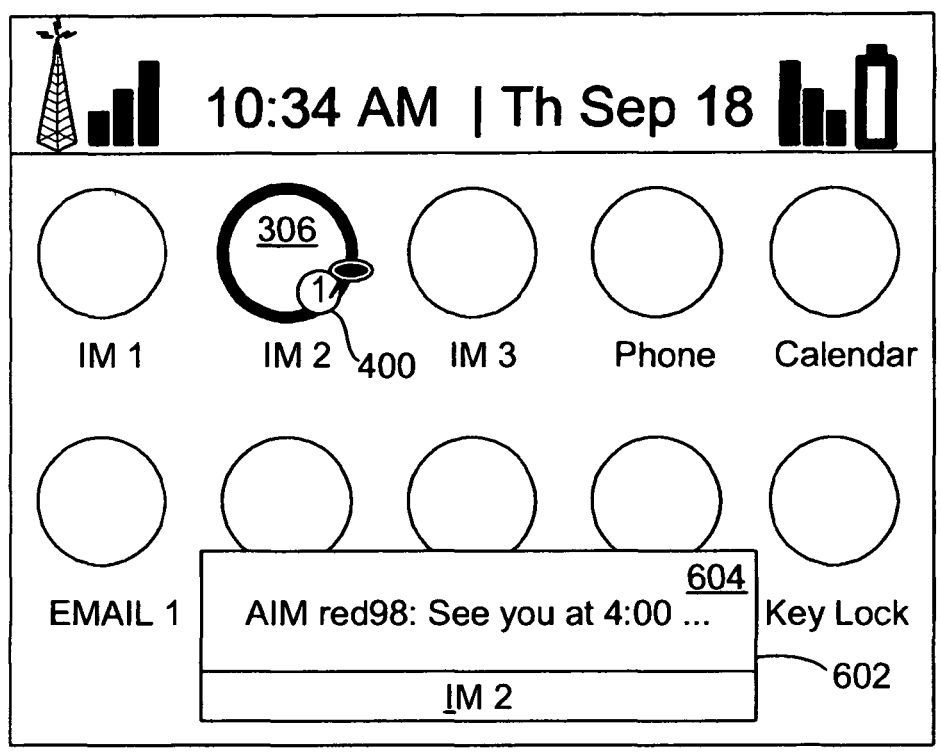
FIG. 6 is an illustration of a change to an IM application icon when the user selects the application icon with the new event.

FIG. 6 is an illustration of main screen 300 when IM application icon 306 having an unread message is highlighted. Upon selection of icon 306, in addition to highlighting the icon, a dialog box 602 comprising a message preview 604 of at least a portion of the unread message is displayed. The opening of the dialog box 604 may be briefly delayed after icon 306 is brought in focus by the user. If a dialog box is opened too quickly as a user navigates among the icons, navigation may be preempted before the user navigates to a particular icon of choice. Dialog box 604 is opened at name region 314 though persons skilled in the art will recognize that another region may be selected to position the dialog box 604. By way of example, message preview 604 in dialog box 602 shows the application service (i.e. "AIM" for AOL Instant Messenger) the correspondent sending the message (i.e. "red98") and a part of the unread message (i.e. "See you at 4:00 . . . ").

Figure 7:
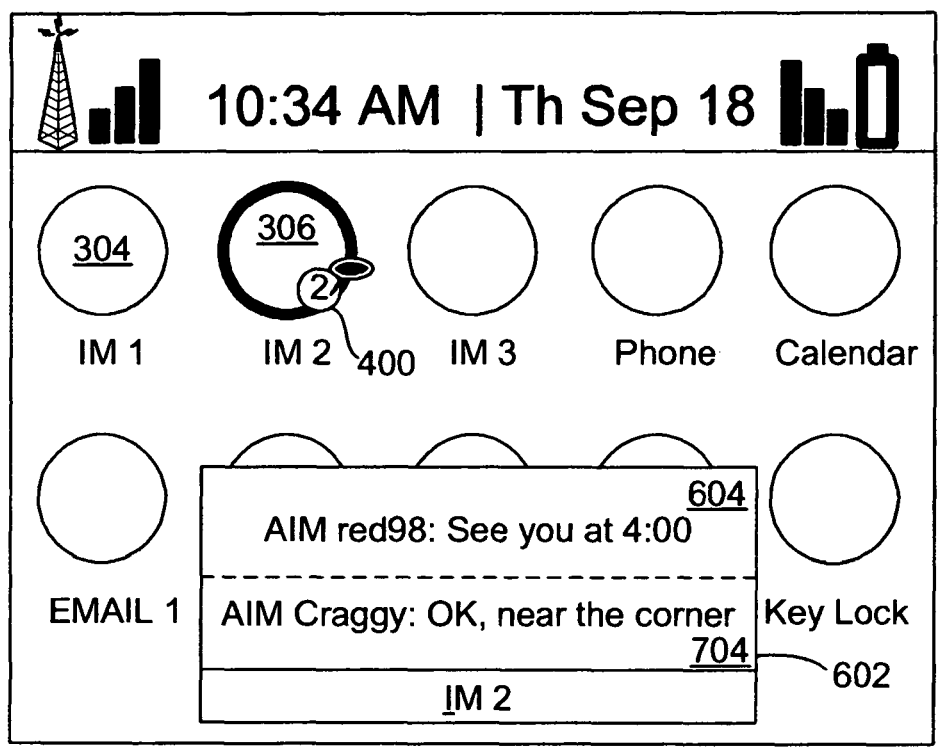
FIG. 7 is an illustration of multiple new events within one application.

FIG. 7 shows a dialog box 602 for an IM application 306 having two unread messages indicated at visual modification 400. Dialog box 602 comprises message previews 604 and 704. Due to the inherent size of main screen 300 and other considerations apparent to those skilled in the art, there is an upper limit to the number of unread messages that may be previewed in such a manner. This limit may be optionally configurable by a user within a predetermined range or simply configured to a maximum size based on the available screen space, font, etc.

Optionally, in accordance with an embodiment of the invention, a user may be enabled to "jump" (i.e. automatically navigate) to the unread message directly from the application icon on the main screen, eliminating any intervening screens that may normally be navigated to read messages when navigating the GUI for the associated application. For example, highlighted icon 306 may be activated as per normal (e.g. selecting "enter" on keyboard 232) and the application initiated to start at an unread message (e.g. most or least recent). The application's initial screen or buddies list may be skipped. The opportunity to "jump" may be time-limited and enabled only for a short period of time immediately following the occurrence of the new event, such as from about a few seconds to about 30 seconds. The "jump" activation anticipates the user's need to see the unread message.

Figure 8:
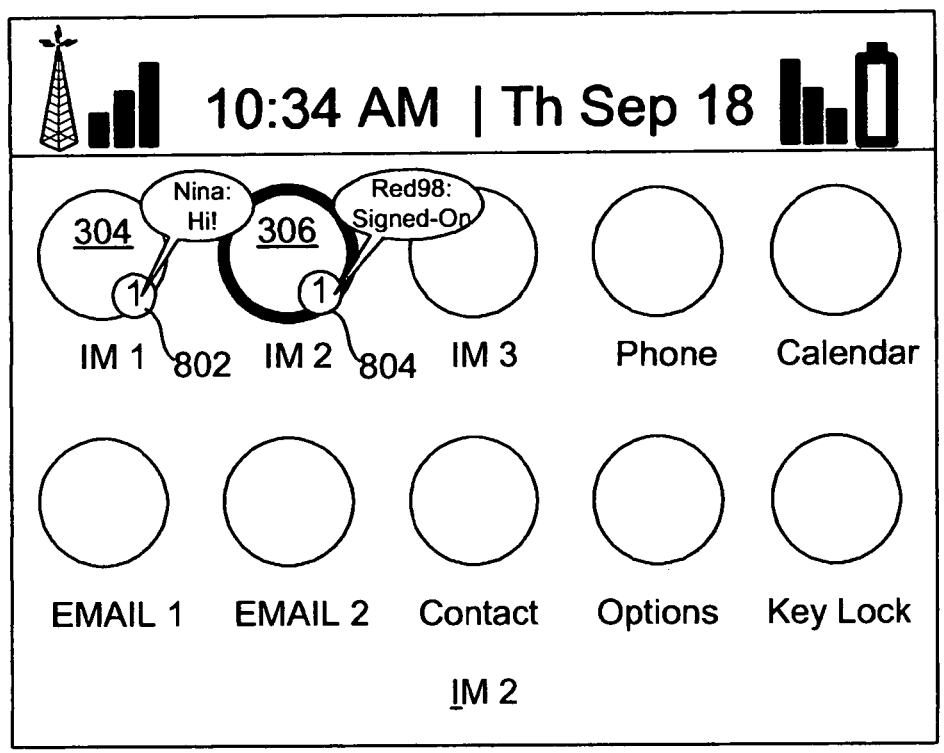
FIG. 8 is an illustration of further embodiments for previewing new events on the main screen.

FIG. 8 is an illustration of another embodiment for previewing events on a main screen of a mobile station such as station 202. In this embodiment, two new events, one for each of IM application icons 304, 306 are indicated via respective visual modifications 802 and 804. Visual modification 802 comprises an event count, namely a count of unread messages and a message preview providing a sender identity and a portion of the unread message. Similarly though differently modification 804 comprises an event count and state preview indicating IM correspondent buddy Tom has signed on. Persons of ordinary skill in the art will appreciate that different events may be visualized on the main screen in accordance with the invention and these events may depend upon the associated application. However, options may be selectively configurable.

Figures 9A, 9B:
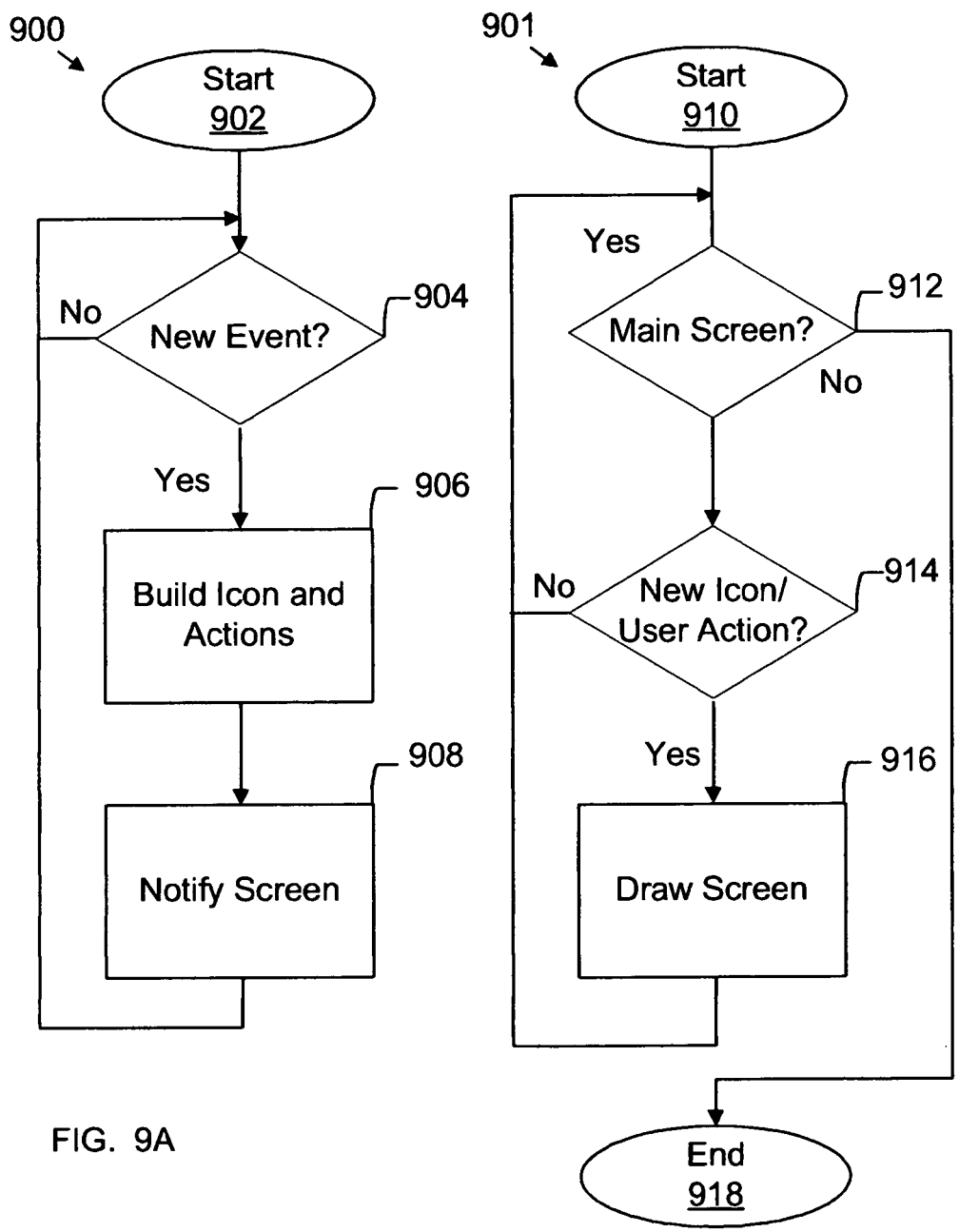
FIGS. 9A and 9B are flowcharts which describe a method in accordance with the invention.

FIGS. 9A and 9B are flowcharts which describe a method in accordance with the invention for the visual modification of an application icon to represent a new event. FIG. 9A represents operations 900 for identifying a new event to determine the modification and FIG. 9B represents operations 901 to display the modification.

Operations 900 may be enabled for a service or other application such as IM, e-mail, etc. Though not shown events to be monitored (for example, by a monitoring component of the GUI) and visually indicated (for example, by a icon modifying component) upon occurrence are predetermined in accordance with a type or types of events to be notified and previewed. For example, for operations 900 for use in accordance with IM, whether the count is to count distinct unread messages or senders is pre-determined.

Beginning at a start block 902 of FIG. 9A, operations 900 commence and the application represented by the application icon to be modified is monitored for a new event (step 904). Persons of ordinary skill in the art will understand that monitoring may be implemented in a number of fashions depending, in part, on operating system and other system services and the interface between communication subsystem 211 and microprocessor 238. Each of the plurality of applications to be monitored may have a dedicated monitoring component to determine the occurrence of respective new events. Alternatively, a single monitoring component could monitor each of the applications. Monitoring may be continuously or intermittently performed repeating step 904, until a new event is determined.

Upon a new event, at step 906, the visual modification to the icon to be changed is determined by an icon modifying component. The counter, if any, is incremented and any visual element or graphic to be overlaid may be configured. For example, text may be obtained for the overlay as exemplified by visual modification 802 of FIG. 8. The counter may be decremented if the monitored event is the reading of a previously unread message, for example.

User actions that may be performed in association with the modified icon may be set up. For example, text for a dialog box may be obtained in advance and associated with the visual modification for use when the icon is highlighted on the main screen by the user. Should the icon be activated to initiate the application, data to facilitate an immediate automatic jump to the most recent unread message may also be determined in advance if necessary, and associated with the visual modification. The sender of the message may be identified and various user action options prepared for that sender. For example, actions to permit a phone call, e-mail, SMS or other selectable message may be presented to a user highlighting an icon having a visual modification.

At step 908, the visual modification and any associated data, as applicable, is identified to a main screen maintenance portion of the PIM GUI or other application responsible for maintaining the main screen as described further with reference to operations 901. The notification may pass an object or other data sharing mechanism to provide the modification and any associated action data. Thereafter, monitoring continues at step 904 of operation 900. Monitoring may continue for as long as station 202 is powered.

Beginning at step 910, operations 901 commence for main screen maintenance. At step 912 operations monitor to determine that the main screen is active. If yes, operations monitor for a user action or a notification of a visual modification to an icon (step 914). Upon such an occurrence, a new screen is drawn reflecting the visual modification of an icon or the user's action (step 916, via Yes branch). Exemplary user actions are moving the focus or cursor over the icons of a main screen to highlight an icon or activating an application associated with the icon. The highlighting of an icon that was previously visually modified may further initiate a dialog box display requiring the drawing of the main screen as described above. Once the screen is drawn at step 916 or if no new icon or user activity is detected at step 914, operations 901 repeat at 912. At step 912, if the main screen is no longer active, for example because a user has navigated to another screen, operations 901 may cease (step 918 via No branch) until the main screen is reactivated (not shown).

Operations 900 illustrate a method aspect of an embodiment of the invention monitoring events of a single application. As will be understood to those of ordinary skill in the art, mobile station 202 may be configured to have multiple monitors, one for each application, or a single monitor configured to monitor all applications for new events. Alternatively, each type of application could have a monitor for monitoring respective instances of the application type. For example, a single monitor could be configured for monitoring the three IM applications of the above-described embodiment, a further monitor may be configured for the two e-mail applications, a further for the phone application, etc.

While operations 910 are illustrated as waiting to be advised of a new visual modification, other initiation mechanisms could be employed. For example, each application or respective monitor therefor could be queried for new visual modifications.

Though operation 900 and 901 are described with reference to new events, persons of ordinary skill in the art will appreciate that modifications may be incorporated therein to expire the preview of a new event and display a default or other icon for an application. For example, with reference to FIG. 8, icon 804 illustrates a status event preview, namely the sign-on of Red98. This preview may be expired automatically after a predetermined period of time. A standard or default icon could be used to replace the preview icon. Alternatively, a modified preview icon could be used such as one indicating a count of new events. Similarly, it may be desired to persist some new event previews information even upon the happening of subsequent new events for the same application. For example, new event information relating to a status of the associated application, (e.g. sign-in/out status, availability etc.) may be persisted even as new events occur and are previewed.

The above-described embodiments of the present application are intended to be examples only. Those of skill in the art may effect alterations, modifications and variations to the particular embodiments without departing from the scope of the application. The invention described herein in the recited claims intend to cover and embrace all suitable changes in technology.

The invention claimed is:

1. A method of displaying a numeric count of distinct senders on a wireless communication device, the method comprising:
    displaying an icon corresponding to an electronic messaging application on a graphical user interface of the wireless communication device;
    receiving a plurality of electronic messages associated with the electronic messaging application from each of a plurality of senders;
    prior to a user invocation of the electronic messaging application, visually modifying the displayed icon corresponding to the electronic messaging application to depict a distinct sender count that numerically identifies a number of distinct senders for which one or more of the plurality of received electronic messages remain unread;
    in response to a user invocation of the electronic messaging application associated with the visually modified icon, displaying a graphic interface that includes a plurality of messaging entries, each messaging entry associated with a distinct sender; and
    opening the electronic messaging application in response to selection of the displayed icon.

2. The method of claim 1, wherein opening the electronic messaging application comprises automatically displaying a second graphical user interface screen corresponding to the electronic messaging application comprising content associated with at least one received electronic message in the plurality of electronic messages in response to received input when the electronic messaging application is opened within a threshold time following receipt of the at least one received electronic message.

3. The method of claim 1, further comprising:
    displaying on the graphical user interface proximate to the displayed icon state information including whether a sender is signed in.

4. The method of claim 1, wherein the message entries include a message entry associated with a sender from whom a message remains unread.

5. The method of claim 2, wherein the first graphical user interface screen is a home screen of the wireless communication device, the home screen including a plurality of application icons including the displayed icon, wherein the plurality of application icons are arranged in an icon grid occupying a majority of the home screen, each icon in the plurality of application icons being selectable to invoke a respective application.

6. The method of claim 2, further comprising:
    visually modifying the displayed icon to include a numeric character representing a decreased count of electronic messages which remain unread responsive to a user invocation of the electronic messaging application and displaying one of more received electronic message in the plurality of electronic messages.

7. The method of claim 6, further comprising:
    displaying on the graphical user interface a preview of content associated with at least one received electronic message in the plurality of electronic messages in response to received input, wherein the preview is displayed for a first period of time after which the preview is removed.

8. The method of claim 7, wherein each messaging entry displays at least a portion of an electronic message and an identifier for the associated sender.

9. The method of claim 6, further comprising providing in addition to the numeric character, additional state information relevant to the electronic messaging application, the additional state information including one of: whether a sender is signed in, the state of the connection, or a current state of the sender.

10. The method of claim 9, further comprising:
    displaying on the graphical user interface proximate to the displayed icon an identifier associated with a sender from whom at least one of the plurality of electronic messages was received in response to received input.

11. The method of claim 10, wherein the identifier associated with the sender from whom the at least one of the plurality of electronic messages was received comprises state information pertaining to the sender.

12. The method of claim 2, further comprising:
    in response to a user selection of one of the messaging entries, displaying the selected messaging entry associated with the distinct sender.

13. A wireless communication device, comprising:
    a processor;
    a display coupled to the processor; and
    a non-transitory medium having stored thereon machine-readable instructions that, when executed by the processor, cause the wireless communication device to:
        display an icon corresponding to an electronic messaging application on a graphical user interface of the wireless communication device;
        receive a plurality of electronic messages associated with the electronic messaging application from each of a plurality of senders;
        prior to a user invocation of the electronic messaging application, visually modify the displayed icon corresponding to the electronic messaging application to depict a distinct sender count that numerically identifies a number of distinct senders for which one or more of the plurality of received electronic messages remain unread;

in response to a user invocation of the electronic messaging application associated with the visually modified icon, display a graphic interface that includes a plurality of messaging entries, each messaging entry associated with a distinct sender; and open the electronic messaging application in response to selection of the displayed icon.

14. The wireless communication device of claim 13, wherein the machine-readable instructions, when executed by the processor to open the electronic messaging application in response to selection of the displayed icon, cause the wireless communication device to:

automatically display a second graphical user interface screen corresponding to the electronic messaging application comprising content associated with at least one received electronic message in the plurality of electronic messages in response to received input when the electronic messaging application is opened within a threshold time following receipt of the at least one received electronic message.

15. The wireless communication device of claim 13, wherein the machine-readable instructions, when executed by the processor to open the electronic messaging application in response to selection of the displayed icon, cause the wireless communication device to:

display on the graphical user interface a preview of content associated with at least one received electronic message in the plurality of electronic messages in response to received input, wherein the preview is displayed for a first period of time after which the preview is removed.

16. A non-transitory medium having stored thereon machine-readable instructions that, when executed by a processor of a wireless communication device, cause the wireless communication device to:

display an icon corresponding to an electronic messaging application on a graphical user interface of the wireless communication device;

receive a plurality of electronic messages associated with the electronic messaging application from each of a plurality of senders;

prior to a user invocation of the electronic messaging application, visually modify the displayed icon corresponding to the electronic messaging application to depict a distinct sender count that numerically identifies a number of distinct senders for which one or more of the plurality of received electronic messages remain unread;

in response to a user invocation of the electronic messaging application associated with the visually modified icon, display a graphic interface that includes a plurality of messaging entries, each messaging entry associated with a distinct sender; and open the electronic messaging application in response to selection of the displayed icon.

17. The non-transitory medium of claim 16, wherein the machine-readable instructions, when executed by a processor of a wireless communication device to open the electronic messaging application in response to selection of the displayed icon, causing the wireless communication device to:

automatically display a second graphical user interface screen corresponding to the electronic messaging application comprising content associated with at least one received electronic message in the plurality of electronic messages in response to received input when the electronic messaging application is opened within a threshold time following receipt of the at least one received electronic message.

18. The non-transitory medium of claim 16, wherein the machine-readable instructions, when executed by the processor, cause the wireless communication device to:

display on the graphical user interface a preview of content associated with at least one received electronic message in the plurality of electronic messages in response to received input, wherein the preview is displayed for a first period of time after which the preview is removed.

\* \* \* \* \*